United States Patent Office 3,646,132
Patented Feb. 29, 1972

3,646,132
DIACID BRIDGED-RING COMPOUNDS
David J. Trecker and Joseph P. Henry, South Charleston, and John W. Lynn, Charleston, W. Va., assignors to Union Carbide Corporation, New York, N.Y.
No Drawing. Original application Dec. 9, 1965, Ser. No. 520,298, now Patent No. 3,492,330, dated Jan. 27, 1970. Divided and this application July 30, 1969, Ser. No. 846,251
Int. Cl. C07c 61/12, 69/74
U.S. Cl. 260—544 L
2 Claims

ABSTRACT OF THE DISCLOSURE

A class of 2,5- and 2,6-diacid norbornane compounds and derivatives, e.g. 5(6)-chloroformyl-2-(chloroformyl-methyl(norbornane, is produced by the free radical addition of a functionally substituted alkane to the unsaturated carbon atoms of a bridged-ring olefin. The functionally substituted alkane is free of non-benzenoid carbon-to-carbon unsaturation and contains at least one hydrogen atom bonded to a carbon atom which, in turn is (i) a carbon atom of a functional substituent or (ii) a carbon atom in a position alpha to the functional substituent. The norbornanes produced have the radical of the functionally substituted alkane bonded to the bridged-ring olefin moiety by a carbon-to-carbon bond. The products are useful in the manufacture of polymers.

This application is a division of application Ser. No. 520,298, filed on Dec. 9, 1965 now Pat. No. 3,492,330.

This invention relates to a process for the manufacture of substituted norbornanes and to novel norbornanes made by such process. Most particularly, this invention relates to a relatively inexpensive process for the manufacture of substituted norbornanes, particularly disubstituted norbornanes which heretofore could only be produced uneconomically, if at all, by devious manipulation of known processes.

There has previously been described processes which are limited to the production of specific di-substituted norbornanes. For examples, U.S. Pat. 2,666,748 describes the manufacture of 2,5 (or 6)-di(aminomethyl)norbornanes by the Diels-Alder reaction of cyclopentadiene with acrylonitrile to form bicyclo[2.2.1]-5-heptene-2-carbonitrile, followed by reaction of this Diels-Alder product with hydrogen cyanide in the presence of cobalt tetracarbonyl and triphenylphosphine. There was obtained 2,5 (or 6)-norbornanedicarbonitrile which, upon hydrogenation, is converted to the di(aminomethyl)-norbornane described previously. This process is incapable of producing any other di(aminoalkyl)norbornane where the amino nitrogen is bonded directly to a primary carbon atom.

U.S. Pat. 2,956,987 describes the manufacture of 2-aminomethyl-5(or 6)-norbornanecarboxylic acid by the hydroformylation of the same carbonitrile described in U.S. Pat. 2,666,748, followed by oxidation of the resulting aldehyde to produce the corresponding cyanocarboxylic acid, which after hydrogenation, provides the aforementioned aminomethylnorbornane carboxylic acid. The patent's process is very specific with respect to the type of substitution attainable on the norbornane ring and is incapable of providing a product where the carboxyl group is bonded directly to a primary carbon atom.

In U.S. Pat. 2,917,490, there is described norbornane-5(or 6)-amino-2-carboxylic acid which is produced by the reaction of the carboxylic acid hydrolyzate of the monocarbonitrile employed in the previous two patents with a nitrile, such as hydrogen cyanide, acetonitrile or benzonitrile, in the presence of a strong acid. As a result of this reaction there is obtained the addition of a carboxyamido group at the ethylenic unsaturation of the carboxylic acid which, after hydrolysis, results in the aforementioned aminocarboxylic acid. The process of that patent is only capable of producing an aminocarboxylic acid wherein the amino nitrogen, as well as the carboxyl group, are bonded to secondary carbon atoms.

In addition to the above, there is described in U.S. Pat. 3,000,864 the compounds 5(or 6)-hydroxynorbornane-2-carboxylic acid by a process which is the same as that described in U.S. Pat. 2,917,490, except that instead of cyanide addition, a carboxylic acid is employed, followed by hydrolysis resulting in hydroxy substitution. Such a process is incapable of producing substitutents bonded to norbornane which are directly attached to primary carbon atoms.

There is described in U.S. Pat. 2,972,602, norbornane-2,5(or 6)-dicarboxylic acids which are produced by the hydroformylation of the aforementioned carbonitrile, described above, resulting in the formaldehyde-substituted carbonitrile which, after oxidation, is converted to the monocarboxy substituted norbornane carbonitrile and after hydrolysis is further converted to the di-carboxy substituted norbornane. This patent is limited also insofar as it is only capable of producing substituted norbornanes wherein the substituents are bonded to secondary carbon atoms.

U.S. Pat. 3,143,570 describes another process for making the diamine described in U.S. Pat. 2,666,748. The process employed in U.S. Pat. 3,143,570 involves the aforementioned hydroformylation technique of the cyanonorbornane followed by reaction of the aldehyde with excess ammonia to form the Schiff's base. The resulting product is hydrogenated in the presence of ammonia to form the diamine.

The process of this invention, in addition to its inherent novelty, is uniquely different from the above art because it is capable of providing multi-substituted bridged-ring compounds, such as di-substituted norbornanes, wherein each substituent is bonded to a carbon atom at least two carbon atoms removed from the other substituent, and at least one of the substituents is in the *exo* configuration thereby minimizing the extent of intramolecular reaction when the bridged-ring compounds are utilized in polymerization reactions for which they are uniquely equipped. In addition, the process of this invention produces polysubstituted bridged-ring compounds unattainable by prior art processes.

The process of this invention involves the free radical addition of a functionally substituted alkane on a bridged-ring olefin. The free radical addition is effected by intermixture of the olefin in the presence of the substituted alkane and a free radical initiator.

The bridged-ring olefins which may be treated in accordance with the process of this invention possess at least one ethylenic unsaturation and include those characterized by the formula.

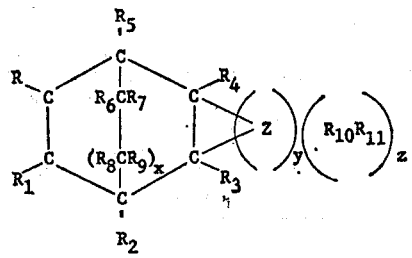

wherein Z may be one of

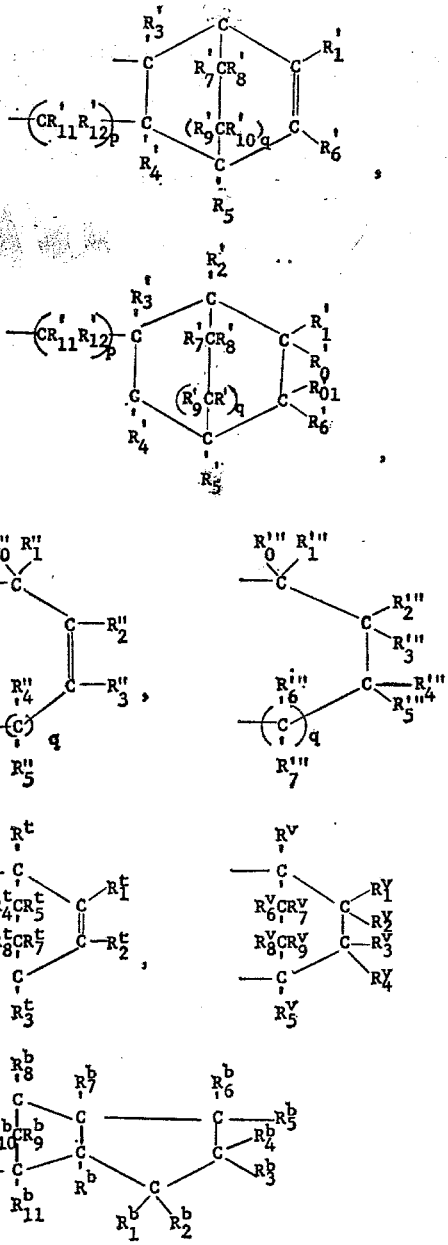

and

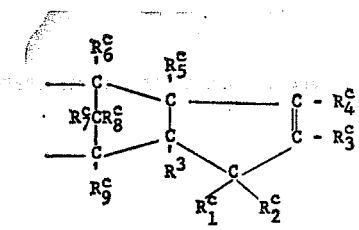

wherein $x$, $y$, $z$, $q$ and $p$ are one of the integer 0 and 1, provided that $z$ is 0 when $y$ is 1 and $y$ is 0 when $z$ is 1, two of the R's, R"s, R'''s, R''''s, $R^t$'s, $R^v$'s, $R^b$'s, and $R^c$'s above, when bonded to adjacent ring carbon atoms may be intrerconnected valence bonds to form ethylenic unsaturation in the ring and one or more of them may be one of hydrogen, monovalent organic radicals and monovalent inorganic sulfur or carbonyl containing radicals, such as: lower alkyl (i.e., of from 1 to about 4 carbon atoms); phenyl, alkylphenyl wherein the alkyl has from 1 to about 6 carbon atoms; carboxyphenyl; hydroxyphenyl; halophenyl (e.g., chloro, iodo, bromo, fluorophenyl); aminophenyl; cyanophenyl; isocyanatophenyl; carbamoylphenyl; alkoxyphenyl; cyano; hydroxy; hydroxyalkyl of from 1 to about 8 carbon atoms; cyanoalkyl of from 1 to about 9 carbon atoms; amino; aminoalkyl of from 1 to about 8 carbon atoms; carboxy; carboxyalkyl of from 1 to about 9 carbon atoms; halo (e.g., chloro, bromo, iodo and fluoro); haloalkyls of from 1 to about 8 carbon atoms and the halo radicals are those described above; carbohydrocarbyloxy (i.e., $$R'O\overset{O}{\underset{\|}{C}}-$$

wherein R' is an alkyl group of from 1 to about 8 carbon atoms or phenyl); alkoxy of from 1 to about 8 carbon atoms, alkoxyalkoxy of from 3 to about 8 carbon atoms, alkoxy(polyalkyleneoxy) of from about 5 to about 1,200 carbon atoms; hydroxyalkoxyalkoxy of from 3 to about 8 carbon atoms; hydroxyalkoxy of from 2 to about 8 carbon atoms; hydroxyalkoxy(polyalkyleneoxy) of from about 5 to about 1,200 carbon atoms; phenyloxy; phenyloxyalkoxy of from 8 to about 10 carbon atoms; phenyloxy (polyalkyleneoxy) of from 10 to about 1,000 carbon atoms; halophenyloxy wherein the halo sub- are described above; hydroxyphenyloxy; carboxphenyloxy; alkoxyphenyloxy, wherein the alkoxy moiety has from 1 to about 6 carbon atoms; aminophenyloxy; cyanophenyloxy; alkylphenyloxy wherein the alkyl moiety has from 1 to about 8 carbon atoms; carbamoylphenyloxy; alkanoyl (e.g., $$R''\overset{O}{\underset{\|}{C}}$$

wherein R" is an alkyl group of from 1 to about 6 carbon atoms); phenylcarbonyl; benzylcarbonyl; alkanoyloxy wherein the alkanoyl group contains from 1 to about 18 carbon atoms; phenoyloxy; benzoyloxy; alkylthio; phenylthio; benzylthio; mercapto; sulfo; sulfamido; 1,2-epoxyalkyl containing from 2 to about 8 carbon atoms; part of carboanhydrides wherein two of R and $R_1$ to $R_9$, each joined to adjacent carbon atoms of the bridged-ring olefin, are divalent carbonyl radicals; part of dialkyleneoxide wherein each alkylene has from 1 to about 10 carbon atoms and are joined at one free valence to oxy and the free valences of the radical are directly bonded to adjacent carbon atoms of the bridged-ring olefin; part of dialkylene sulfide, dialkylene sulfoxide and dialkylene sulfone wherein each alkylene has from 1 to about 10 carbon atoms and the free valences of the radical are directly bonded to adjacent carbon atoms of the bridged-ring olefin; part of oxydicarbonyl wherein its free valences are directly joined to adjacent carbon atoms of the bridged-ring olefin; part of alkylene of from 2 to about 8 carbon atoms where its free valences are bonded to adjacent carbon atoms of the bridged-ring olefin; part of alkenylene of from 2 to about 8 carbon atoms where its free valences are bonded to adjacent carbon atoms of the bridged-ring olefin; carboxamide; alkamido of from 1 to about 9 carbon atoms; phenylamido; benzylamido; chloroformyl; part of imidodicarbonyl where the free valences are bonded to adjacent carbon atoms of the bridged-ring olefin; keto; part of alkylenone of from 1 to about 8 carbon atoms where the free valences are bonded to adjacent carbon atoms of the bridged-ring olefin; part of dicarbonyl alkylene of from 3 to 4 carbon atoms where the free valences are bonded to adjacent carbon atoms of the bridged-ring olefin; part of dioxyalkylene of from 2 to about 8 carbon atoms where each oxygen is directly bonded to the same carbon atom of the bridged-ring olefin; thio; part of methylene where the carbon is double bonded to a carbon atom of the bridged-ring olefin; part of alkylmethylene, dialkylmethylene, alkylphenylmethylene, benzylalkylmethylene (where the alkyl groups have from 1 to about 8 carbon atoms), phenylmethylene, diphenylmethylene, benzylmethylene, dibenzylmethylene and phenylbenzylmethylene wherein the methylene moiety is double bonded to a carbon atom of the bridged-ring olefin; part of isonitroso where the nitrogen is double bonded to a carbon atom of the bridged-ring olefin; dialkoxyalkyl of from 3 to about 9 carbon atoms; alkylenedioxyalkyl of from 3 to about 7 carbon atoms; part of oxycarbonyl wherein its free valences are directly bonded to adjacent carbon atoms of the bridged-ring olefin; part of dialkyleneoxycarbonyl of from 3 to about 8 carbon atoms where its free valences are directly bonded to adjacent carbon atoms of the bridged-ring olefin; divalent alkylenecarbonyloxy and carbonyloxyalkylene where the alkylene group has from 1 to about 6 carbon atoms and the free valences are joined to adjacent carbon atoms of the bridged-ring olefin; part of divalent oxy where each free valence is joined to adjacent carbon atoms of the bridged-ring olefin; glycidyloxy; and the like.

Illustrative examples of radicals representing one or more of the R's, R"'s, R"'s, R""'s, R$^t$'s, R$^v$'s, R$^b$'s, and R$^c$'s include: methyl, ethyl, n-propyl, isopropyl, n-butyl, isobutyl, sec.-butyl, t.-butyl; 4-methylphenyl, 4-ethylphenyl, 3 - isopropylphenyl, 2 - isobutylphenyl, 2,4 - dimethylphenyl, and the like; 4 - carboxyphenyl, 3,5 - dicarboxyphenyl, and the like; 4 - hydroxyphenyl, 3,5 - dihydroxyphenyl, 3,4,5 - trihydroxyphenyl, and the like; 4 - chlorophenyl, 4 - bromophenyl, 3 - fluorophenyl, 2,4-dichlorophenyl, 4 - iodophenyl, 2,3,4,5,6 - pentachlorophenyl, and the like; 4 - aminophenyl, 3,5 - diaminophenyl, 4 - aminomethylphenyl, 4 - gamma - amino-propylphenyl, and the like; 4 - cyanophenyl, 3,5-dicyanophenyl, 2,4-dicyanophenyl, and the like; 2,5-diisocyanato-4 - methylphenyl, 4 - isocyanatophenyl, and the like; 4-carbamoylphenyl, 2,5 - dicarbamoyl - 4 - methylphenyl, and the like; 4 - methoxyphenyl, 2,4 - diethoxyphenyl, 4-methoxy - 3,5 - diethoxyphenyl, and the like; 2-hydroxyethyl, hydroxymethyl, 4 - hydroxybutyl, 1,2-dihydroxyethyl, 6 - hydroxy - 2 - ethylhexyl, and the like; cyanomethyl, 2 - cyanoethyl, 5 - cyanohexyl, and the like; aminomethyl, 3 - aminopropyl, 8 - aminooctyl, and the like; 2 - carboxyethyl, 4-carboxypentyl, and the like; chloromethyl, bromomethyl, iodomethyl, fluoromethyl, dichloromethyl, trichloromethyl, perchloropropyl, perfluorobutyl, 2 - chloro - 1,2 - tetrafluoroethyl, and the like; carboethoxy, carbomethoxy, carbocyclohexyloxy, carbophenyloxy, and the like; methoxy, ethoxy, isopropoxy, n-propoxy, hexoxy, and the like; methoxyethoxy, methoxypropoxy, methoxyisopropoxy, ethoxybutoxy, and the like;

CH$_3$O-(-CH$_2$CH$_2$O-)$_2$ to 600    CH$_3$CH$_2$O-(-CH$_2$CHO-)$_2$ to
$\quad\quad\quad\quad\quad\quad\quad\quad\quad\quad\quad\quad\quad\quad\quad$ CH$_3$ and the like; hydroxyethoxy, hydroxyisopropoxy, hydroxy - n - propoxy, and the like; hydroxyethoxyethoxy, hydroxyisopropoxyisopropoxy, and the like;

HO(CH$_2$CH$_2$O)$_{2\,to\,600}$ ,   HOCH$_2$CH$_2$O(CH$_2$CHO)$_{2\,to\,400}$ ,
$\quad\quad\quad\quad\quad\quad\quad\quad\quad\quad\quad\quad\quad\quad\quad$ CH$_3$ and the like; phenyloxyethoxy, phenyloxyisopropoxy, and the like;

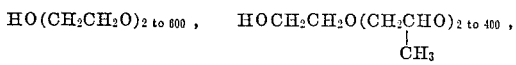

and the like; 4 - chlorophenoxy, 4 - bromophenoxy, 3,5-diiodophenoxy, and the like; 4 - hydroxyphenoxy, 3,5-dihydroxyphenoxy, 4 - hydroxy-methylphenoxy, and the like; 4 - carboxyphenoxy, 2,4 - dicarboxyphenoxy, and the like; 4 - methoxyphenoxy, 2,4 - di-n-butoxyphenoxy, and the like; 4-aminophenoxy, 4-aminomethylphenoxy, and the like; 4 - cyanophenoxy, and the like; 4 - methylphenoxy, 2,3,4,5,6 - pentamethylphenoxy, 4-n-octylphenoxy, and the like; 4 - carbamoylphenoxy, and the like; acetyl, propionoyl, benzoyl, phenylacetyl, and the like; acetyloxy, propionoyloxy, benzoyloxy, phenylacetyloxy, and the like; methylthio, n-hexylthio, and the like; ethylsulfamido, and the like; 1,2 - epoxyethyl, 7,8 - epoxy-n-octyl, 3,4-epoxy-n-hexyl, and the like; dimethyleneoxide, diethyleneoxide, methylene ethyleneoxide, and the like; dimethylene sulfide, diethylene sulfoxide, methylene ethylene sulfone, and the like; ethylene, tetramethylene, and the like; propenylene, 3-n-hexylene, and the like; acetamido, butyramido, and the like; trimethylen-2-one, pentamethylen - 2 - one, and the like; tetramethylen-1,4 - dione, hexamethylen - 1,6 - dione and the like; dioxyethylene, dioxypropylene, and the like, methylmethylene, dimethylmethylene, methylethyl methylene, phenylmethylene, methylphenyl methylene, diphenylmethylene, methylbenzyl methylene, dibenzylmethylene, and the like; dimethoxymethyl, diethoxymethyl, dibutoxymethyl, 1,1 - dimethoxyethyl, and the like; 1,2 - ethylenedioxymethyl, 1,2 - ethylenedioxy - 1 - ethyl, and the like; di(methylene)oxycarbonyl, methyleneoxycarbonyl, methylenecarbonyloxy, di(ethylene)oxycarbonyl, and the like.

The aforementioned bridge-ring compounds are obtained easily by classical reactions such as by a Diels-Alder reaction between cyclopentadiene or substituted cyclopentadiene and an ethylenically unsaturated compound which may or may not bear the aforementioned substituents. The following table illustrates the type of products produced. It must be borne in mind that the following is not intended to restrict the scope and number of bridge-ring compounds usable in the practice of this invention.

TABLE

| CYCLOPENTADIENE | ETHYLENICALLY UNSATURATED COMPOUND | BRIDGED-RING COMPOUNDS |
|---|---|---|
|  | CH$_2$=CHCN |  |
|  | CH$_2$=CH$_2$CH$_2$OH |  |
|  | CH$_2$=CH$_2$COOH | 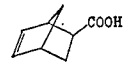 |
|  | CH$_2$=CH$_2$COOCH$_3$ | 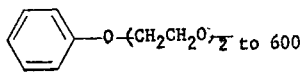 |
| | | 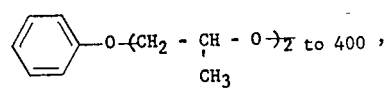 |
|  | CH$_2$=C(CH$_3$)(COOH) |  |
| 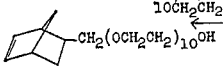 | CH$_2$=CH-CHO |  |
| | |  |
|  | CH$_2$=C(CH$_3$)$_2$ | 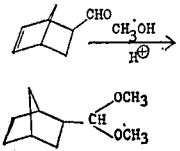 |
|  | CH$_2$=C=CH$_2$ | 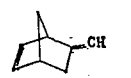 |

3,646,132

TABLE—Continued

| Cyclopentadiene | Ethylenically unsaturated compound | Bridged-ring compounds |

TABLE—Continued

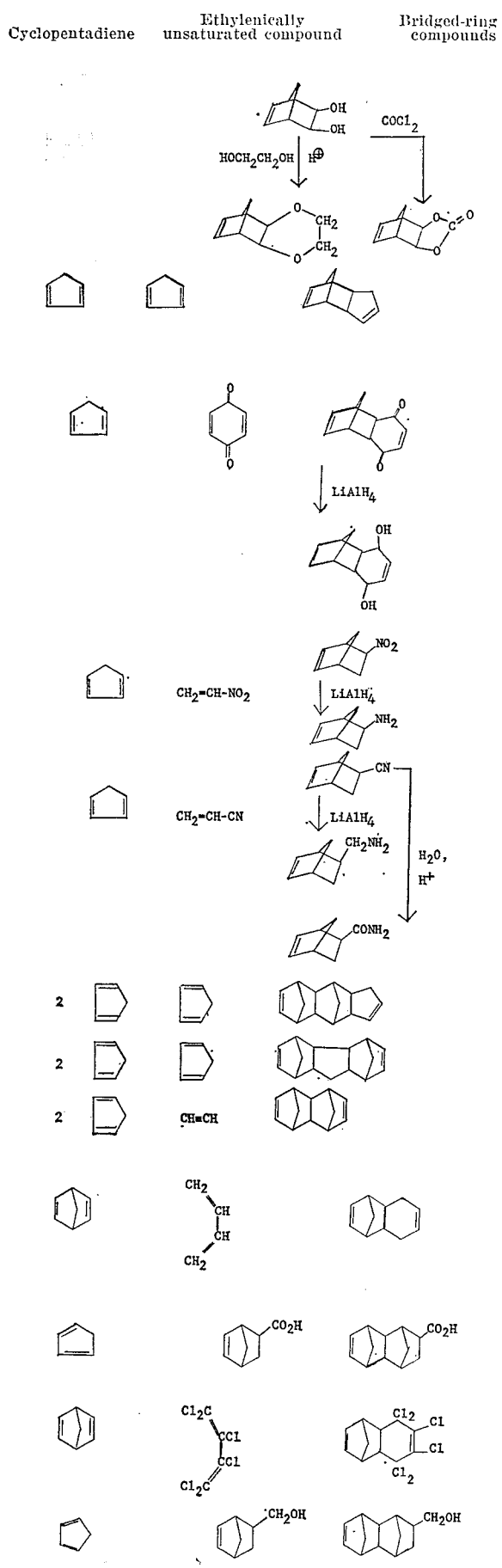
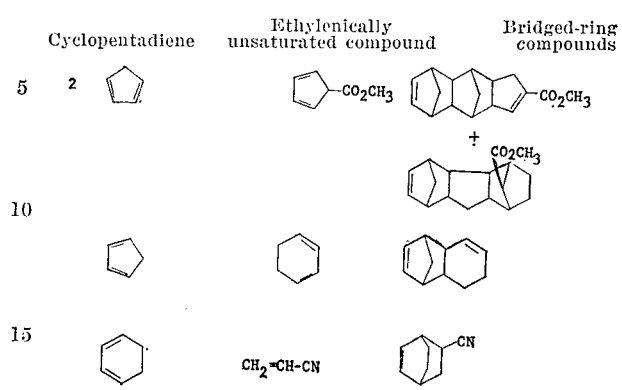

As mentioned previously, this invention involves the addition of functionally substituted alkanes in the bridged-ring olefin at the unsaturation thereof. The term "functionally substituted alkanes" as employed herein and in the claims, encompasses those compounds free of non-benzenoid carbon to carbon unsaturation and which contain at least one hydrogen atom bonded to a carbon atom which in turn is a carbon atom of a functional substituent or a carbon atom in a position alpha to a functional substituent. Illustrative of the term "functional substituent" or "functionally substituted," as employed herein and in the claims, are the following: hydroxyl, cyano, carboxy, hydrocarbyloxycarbyl, amino, oxy, dicarboanhydride, formamido, carboxamido, phenyl, substituted phenyl (wherein the substituents are alkyl (1 to about 20 carbon atoms) halo (as described above), hydroxy, carboxy, cyano, amino, alkoxy (1 to about 4 carbon atoms)), carbamoyl, and the like.

Apart from the functional substituents, these compounds are typically composed of carbon and hydrogen, and in many cases, oxygen also. Illustrative functionally substituted alkanes suitable in the practice of this invention include, by way of example only, the following: alkyl and alkylene alcohols, such as methanol, ethanol, isopropyl alcohol, isobutyl alcohol, cyclohexanol, benzyl alcohol, benzhydryl alcohol, ethylene glycol, 1,2-propylene glycol, 1,4-butane diol, glycerol, and the like; cyanides, such as methyl cyanide, ethyl cyanide, isopropyl cyanide, benzyl cyanide, cyclohexyl cyanide, malononitrile, cyanohydrin, and the like; carboxylic acids, such as acetic acid, propionic acid, butyric acid, 1,4-cyclohexanedicarboxylic acid, isobutyric acid, phenylacetic acid cyclopentylcarboxylic acid, malonic acid, succinic acid, glutamic acid, adipic acid, stearic acid, lactic acid, 1,4-bis(carboxypropyl)benzene, glycine, and the like; carboxylic esters, such as ethyl acetate, methyl isobutyrate, methyl acetate, isopropyl isobutyrate, ethyl phenylacetate, methyl cyclohexylcarboxylate, dimethylmalonate, dineopentyladipate, diethyl succinate, and the like; amines, such as methylamine, trimethylamine, diethylamine, cyclohexylamine, benzylamine, n-butylamine, ethylenediamine, diethylenetriamine, morpholine, hexamethylenediamine, ethanolamine, diethanolamine, piperazine, methylolamine, N,N', N" - trimethylmelamine, N,N'N" - trimethylolmelamine, and the like; epoxides and ethers such as diethyl ether, dimethyl ether, ethylene oxide, propylene oxide, 1,4-dioxane, epichlorohydrin, tetrahydrofuran, phenyl isopropyl ether, phenyl methyl ether, dimethyl ether of ethylene glycol, dimethyl ether of dipropylene glycol, hydroxy-terminated polyalkylene oxides (e.g., polyethylene oxide), and the like; anhydrides such as acetic anhydride, diisobutyric anhydride, succinic anhydride, benzoic acetic anhydride, and the like; formamides, such as formamide, methyl formamide, diethyl formamide, dimethyl formamide, phenyl formamide; formic acid and derivatives, such as methyl formate and phenyl formate; amides, such as acetamide, n-propionamide, n-butyramide, isopropionamide, isobutyramide, adipamide, succinamide, N-methylacetamide, N,N-diethylacetamide, ethylene bis-acetamide, N,N-diethyladipamide, ethylene bis(isobutyroamide), and the like; phenyl derivatives, such as methylbenzene, ethylbenzene, isopropylbenzene, n-octylbenzene, n-laurylbenzene, bis(phenyl)methane, bis(4-phenyl)-1-ethane, 1,4-dimethylbenzene, 1,3,5-trimethylbenzene, 4-carboxytoluene, 4-chlorotoluene, 2,4-dichlorotoluene, 3-trifluoromethylcumene, 4-methylphenol, 5-methylpyrogallol, 4-methylbenzoic acid, 5-methylphthalic acid, 2-methylterephthalic acid, 4-cyanotoluene, 3-methylaniline, 4-methoxytoluene, 3-n-butoxycumene, 2-methylolphenol, 3-carbamoyltoluene, N-methylcarbamoyltoluene, N-phenylcarbamoyltoluene, N-phenyl-N-methylcarbamoyltoluene, 2,4-toluenediisocyanate, and 2,6-toluenediisocyanate (and mixtures of toluene diisocyanates).

It is to be appreciated from the above that the term "functionally substituted alkane" (or "alkane" for brevety) is not intended to be construed as simple alkane bearing a functional substituent, but rather is intended to mean herein and in the claims to be a functionally substituted organic compound free of ethylenic and acetylenic unsaturation and containing a carbon atom having a hydrogen atom directly bonded thereto which carbon atoms is in one of the following positions: (1) the position alpha to the functional substituent where the substituent is free of such a carbon atom and (2) a position part of the functional substituent. The remainder of the organic compound may contain any other combination of atoms. The organic compounds may contain 1, 2, 3, 4, and more functional substituents though preferably not more than 2 such substituents.

The aforementioned reaction occurs by way of free radical addition by intermixing at least one of the functionally substituted alkanes with at least one of the bridged-ring olefins in the presence of a free radical initiator, such as the conventional free radical addition catalysts so well known in the art. The general classes of free radical initiators include peroxides, azo compounds, peresters, peracids, heat and the like.

Illustrative of suitable initiators include the following: peroxide compounds such as tertiary butyl hydroperoxide, di-tert.-butyl peroxide, di-tert.-amyl peroxide, lauroyl peroxide, benzoyl peroxide, cumene hydroperoxide, dicumyl peroxide, hydrogen peroxide, tert.-amyl hydroperoxide, tert.-hexyl hydroperoxide, diacetyl peroxide, as well as many others; azo compounds such as azo-bis-isobutyronitrile, azo-bisisoamylnitrile, azo-bisisohexylnitrile, azo-bis-2-ethyl butyronitrile, azo-bis-2-methyl-3-phenyl propionitrile, azo-bis-2-n-propyl amyl nitrile; peresters such as tertiary butyl peracetate, cyclohexyl peracetate, neo-pentyl peracetate, peracids such as peracetic acid, perpropionic acid, perisobutyric acid and the like.

Broadly, the function of the free radical initiator is to provide energy for removal of a hydrogen atom from the functionally substituted alkanes described above. The energy may be in the form of radical fragments from the initiator (as is the case with the peroxides, peracids, peresters and the azo compound) or be in the form of thermal energy.

The free radical addition reaction may be effected in liquid or vapor phase. The liquid phase reaction may be effected as a heterogeneous or homogeneous liquid phase mixture of the component involved in the addition reaction. Essentially all of the functionally substituted alkanes described above are liquid at the temperature of the addition reaction and therefore can be utilized as the liquid body in which the bridged-ring olefin and the initiator is dispersed. The manner of dispersion i.e., whether homogeneous, or heterogeneous, depends on the solvating action of the functionally substituted alkane towards the bridged-ring olefin employed, or the solvating action of the bridged-ring olefin employed toward the functionally substituted alkane. Usually, an excess of one of the functionally substituted alkane and the selected bridged-ring olefin is employed when one of them is chosen to serve as the solvating or dispersing medium.

However, other compounds which are liquid at the addition reactive temperature may be optionally employed as a solvent for one or both of the prime reagents (i.e., the "alkane" and the "bridged-ring olefins") or as a liquid dispersant for both. Illustrative of such compounds include, by way of example only, benzene, chlorobenzene, 1,4-dichlorobenzene, 1,2-dichlorobenzene, 1,3-dichlorobenzene, nitrobenzene, 1,2-dinitrobenzene, diphenylether, bis(4-chlorophenyl)ether, 1,2- and 1,6-dichloronaphthalene, and the like. The selection of such solvating or dispersing liquids is not critical except that they should be essentially inert to the free radical addition reaction and not cause an unwanted amount of reaction by-products.

In the preferred operation of this process, an excess of the functionally substituted alkane over the stoichiometry of the reaction is employed to provide the liquid conditions of the reaction. In the most preferred embodiment, the reaction is carried out as a homogeneous liquid phase.

The process may also be carried out in the vapor phase where the "alkane" and "bridged-ring olefin" is intermixed as gases in an environment containing the free radical initiator. For example, a stream comprising an admixture of the "alkane" and the "bridged-ring olefin" can be passed through a bed of zeolitic molecular sieves having adsorbed therein one of the aforementioned peroxides, peracids, peresters and azo compounds. Particularly preferred, is a zeolitic molecular sieve having di-tert.-butyl peroxide or tert.-butyl hydroperoxide adsorbed therein. At the temperature of reaction, the initiator is desorbed from the sieve to catalyze the reaction or the reactants are absorbed ino the sieve where catalysis takes place. Usually both occurs during the reaction.

A preferred manner of carrying out the addition reaction involves adding the "bridged-ring olefin" and the initiator in the initiator in incremental portions to an excess of the functionally substituted alkane heated at the reaction temperature. The resulting addition product is separable from the reaction system by conventional procedures such as distillation, crystallization, solvent extraction, decantation, and the like. Distillation is the procedure most often employed.

The addition reaction proceeds at a rate dependent upon the reactants, the catalysts, the concentrations of the reaction components, the solvent, the temperaure and he like considerations. Usually, the reaction can vary over seconds to hours depending upon the above points of consideration typically controlling reactions.

The reaction may proceed over a wide temperature range, but, however, the temperature of the reaction must be sufficiently high enough to cause the initiator to provide the energy for removal of a hydrogen atom from the functionally substituted alkane. With respect to the compounds which are free radical initiators, the temperature should be sufficiently high to cause their decomposition into free radical fragments. Depending upon the free radical initiator employed, the temperature of the reaction may range from about 10° C. up to about 250° C., preferably from about 30° C. to about 200° C. In the usual case, the temperature employed is between about 80° C. and about 180° C., inclusive, and more preferably, between about 110° C. and about 160° C., inclusive. The most preferred operating temperature ranges from the standpoint of rate and yields is between about 130° C. and about 150° C., inclusive.

The proportion of the functionally substituted alkane to the "bridged-ring olefin" may vary considerably, but for better yields of reaction product it is desirable to employ a molar ratio of the functionally substituted alkane to the "bridged-ring olefin" of at least about 0.1. This molar ratio may be as large as 500, or more. Preferably, the molar ratio of the "alkane" to the "bridged-ring olefin" is between about 0.5 and about 500, inclusive, and, most desirably, between about 2 and about 300, inclusive. In the most preferred embodiment, where optimum yields are most often attainable, the molar ratio is typically between about 5 to about 200.

The amount of free radical initiator necessary is that catalytically effective amount which causes the free radical addition reaction to proceed. In the case of the free radical initiating compounds, the usual catalytic quantities are employable. Typical catalytic quantities of these compounds may range from about 0.01 mole percent to equal molar quantities based on the molar amount of the "bridged-ring olefin" undergoing reaction. Preferably, there is employed from about 5 to about 50 mole percent of the compound, based on the molar amount of the "bridged-ring olefin" undergoing reaction, and the most desirable amount of the compound is from about 20 to about 40 mole percent, based on the moles of the "bridged-ring olefin" undergoing reaction.

The process, when carried out in liquid phase, may be under any atmosphere, though preferably under an inert atmosphere such as nitrogen, carbon dioxide, argon, helium, and the like. In a vapor state reaction, the atmosphere should be inert. This may be accomplished by maintaining the reactant vapors as the total atmosphere or by feeding an inert gas or gases, such as the above inert gases, to the reaction zone.

The pressure at which the reaction proceeds is not critical. However, when the "alkane" is gaseous at the reaction temperature, it is preferable to employ superatmospheric pressure conditions. Subatmospheric or atmospheric pressures may be employed instead, but are desirably utilized when all of the reactants are liquid at the operating temperature. In vapor phase reactions, pressures ranging from subatmospheric to superatmospheric may be employed.

Typical of the functionally substituted bridged-ring compounds obtained by the process of this invention and the manner by which they are obtained are illustrated by the following:

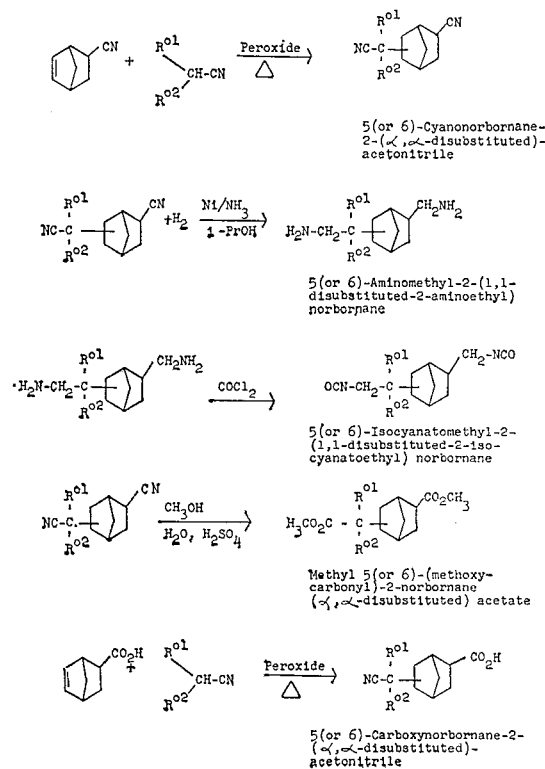

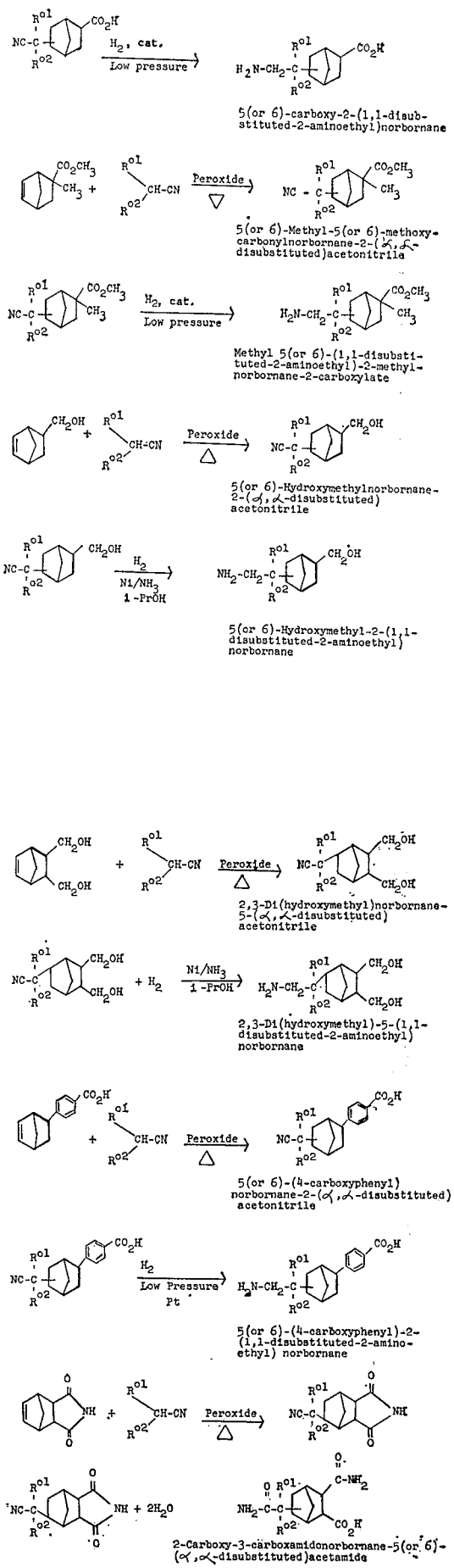

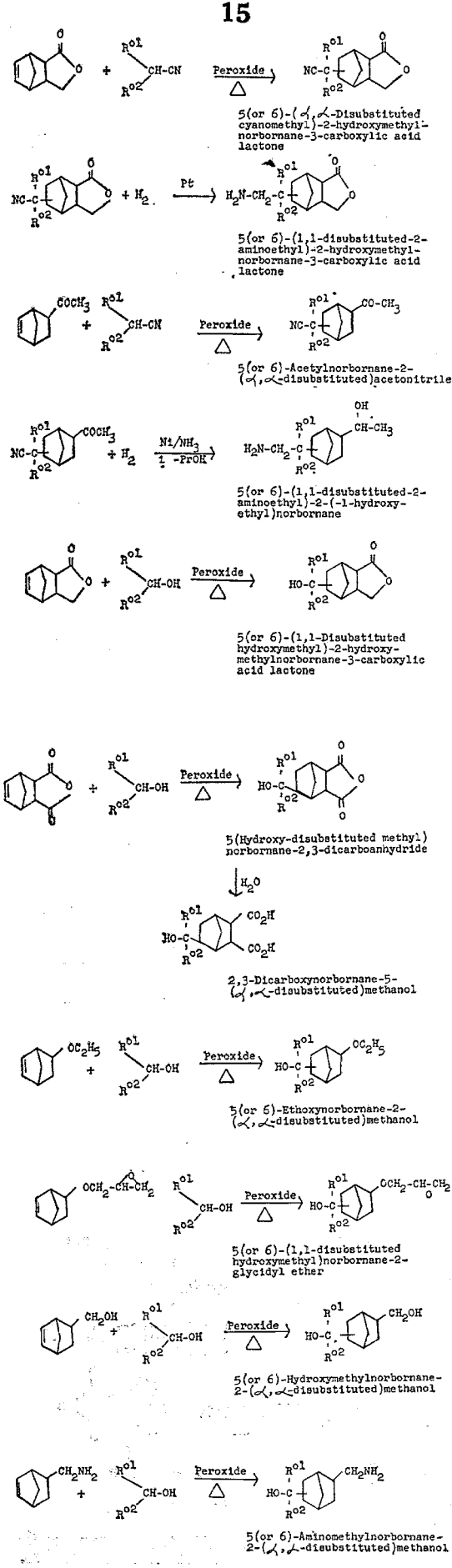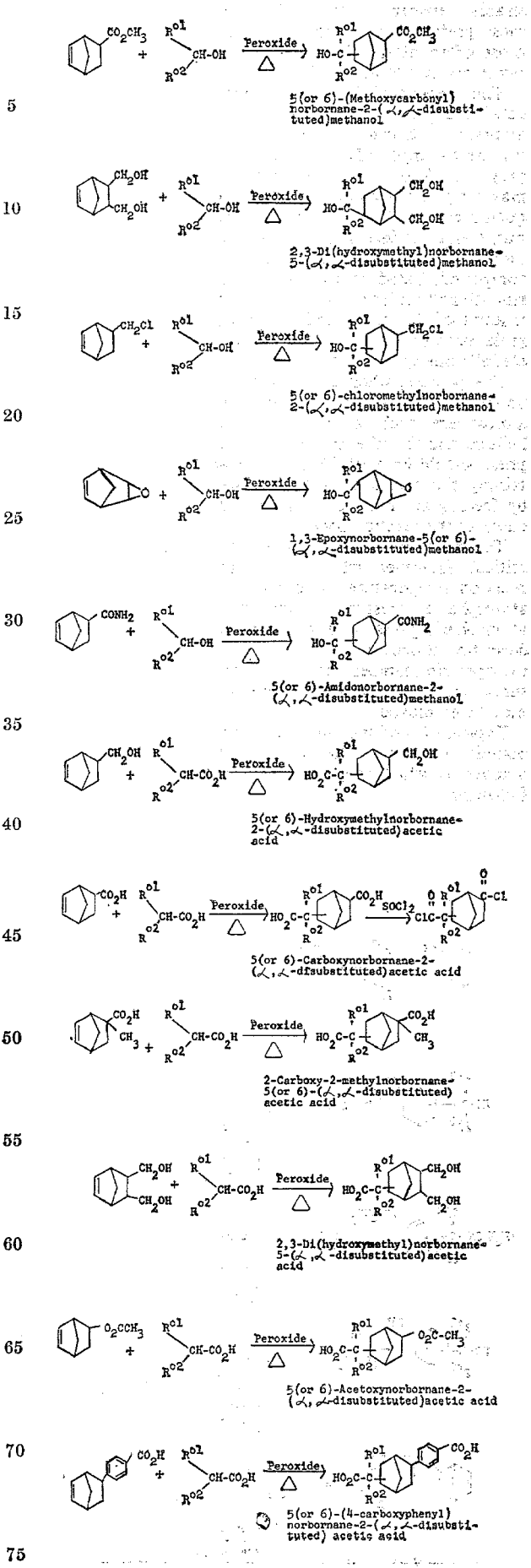

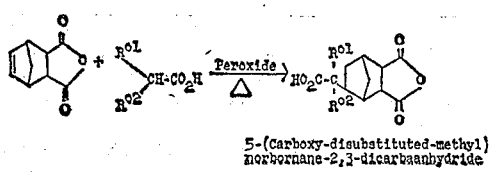

5-(Carboxy-disubstituted-methyl)
norbornane-2,3-dicarbanhydride

↓ H₂O

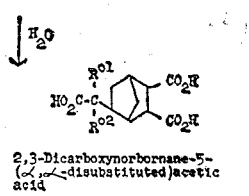

2,3-Dicarboxynorbornane-5-
(α,α-disubstituted)acetic
acid

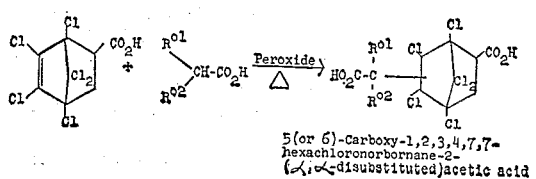

5(or 6)-Carboxy-1,2,3,4,7,7-
hexachloronorbornane-2-
(α,α-disubstituted)acetic acid

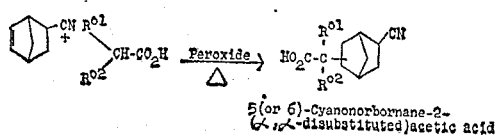

5(or 6)-Cyanonorbornane-2-
(α,α-disubstituted)acetic acid

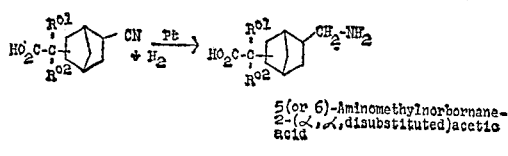

5(or 6)-Aminomethylnorbornane-
2-(α,α-disubstituted)acetic
acid

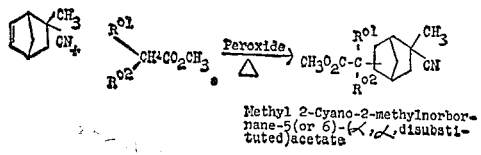

Methyl 2-Cyano-2-methylnorbor-
nane-5(or 6)-(α,α-disubsti-
tuted)acetate

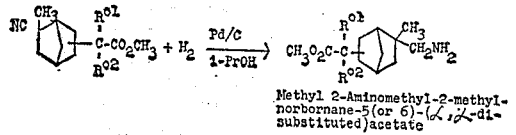

Methyl 2-Aminomethyl-2-methyl-
norbornane-5(or 6)-(α,α-di-
substituted)acetate

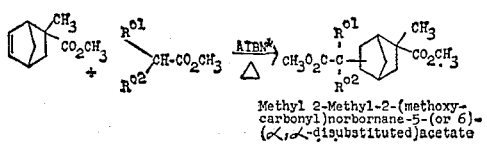

Methyl 2-Methyl-2-(methoxy-
carbonyl)norbornane-5-(or 6)-
(α,α-disubstituted)acetate

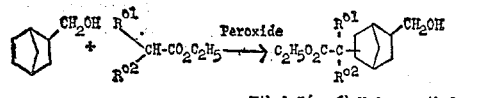

Ethyl 5(or 6)-Hydroxymethyl-
norbornane-2-(α,α-disubsti-
tuted)acetate

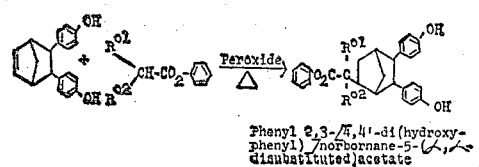

Phenyl 2,3-/4,4'-di(hydroxy-
phenyl)/norbornane-5-(α,α-
disubstituted)acetate

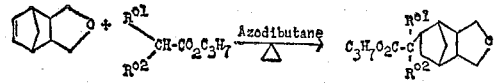

n-Propyl 2,3-Dimethyleneoxy-
norbornane-5-(α,α-disubsti-
tuted)acetate

* "AIBN" is an abbreviation of azobis(isobutyronitrile)

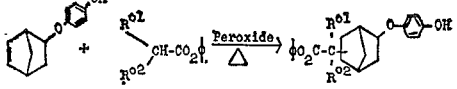

Phenyl 2-(4-hydroxyphenoxy)
norbornane-5(or 6)-(α,α-di-
substituted)acetate

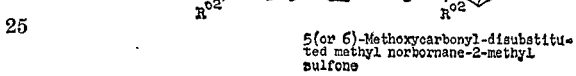

5(or 6)-Methoxycarbonyl-disubstitu-
ted methyl norbornane-2-methyl
sulfone

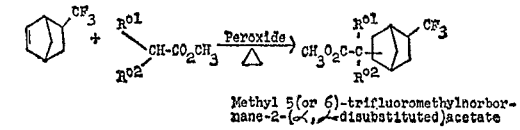

Methyl 5(or 6)-trifluoromethylnorbor-
nane-2-(α,α-disubstituted)acetate

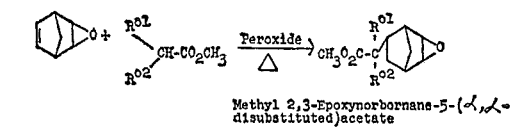

Methyl 2,3-Epoxynorbornane-5-(α,α-
disubstituted)acetate

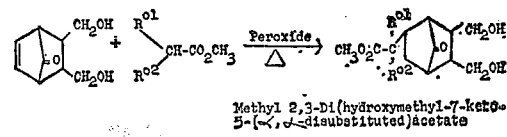

Methyl 2,3-Di(hydroxymethyl-7-keto-
5-(α,α-disubstituted)acetate

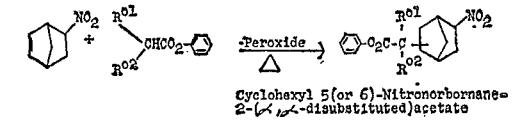

Cyclohexyl 5(or 6)-Nitronorbornane-
2-(α,α-disubstituted)acetate

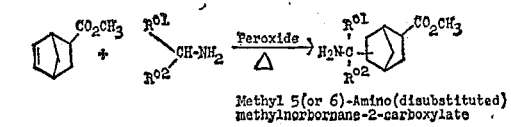

Methyl 5(or 6)-Amino(disubstituted)
methylnorbornane-2-carboxylate

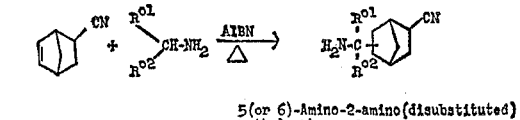

5(or 6)-Amino-2-amino(disubstituted)
methylnorbornane

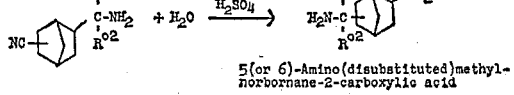

5(or 6)-Amino(disubstituted)methyl-
norbornane-2-carboxylic acid

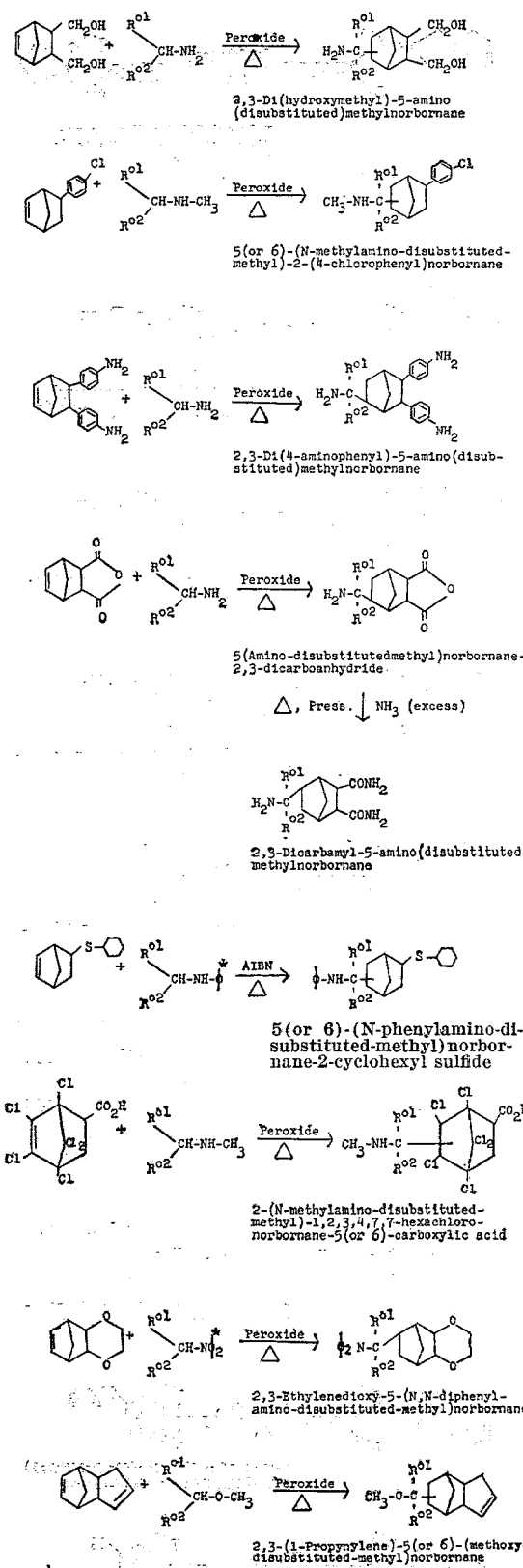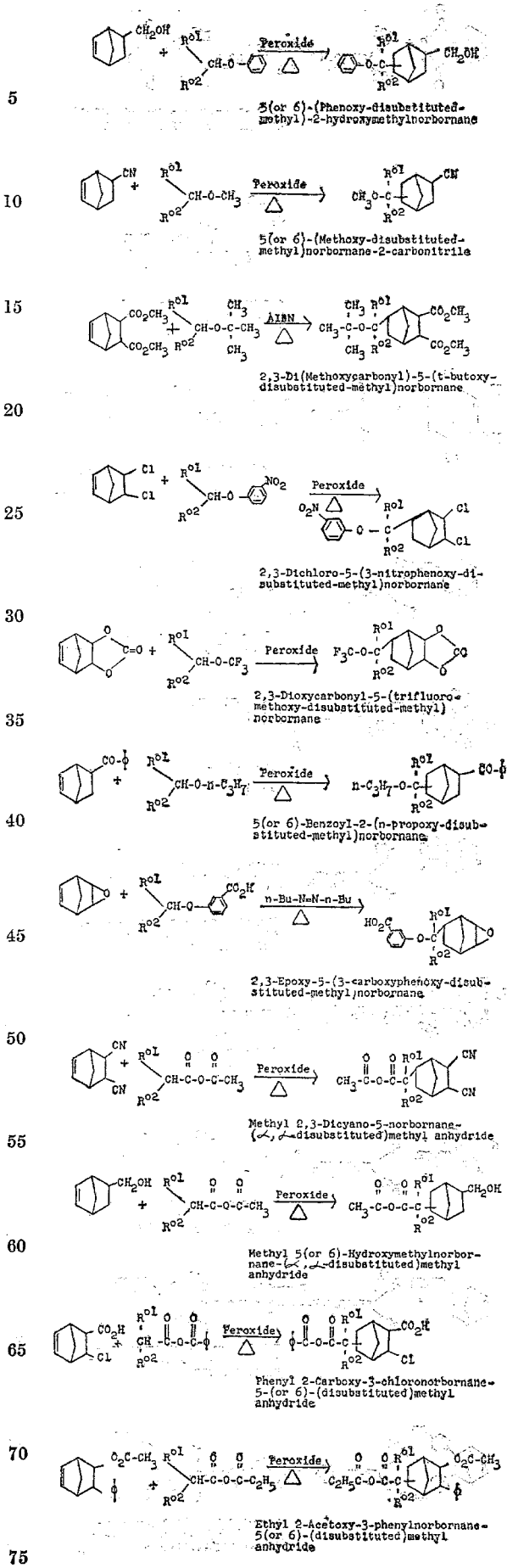

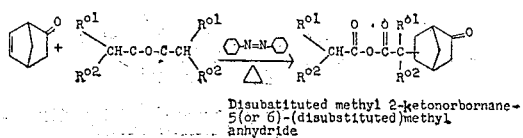

Disubstituted methyl 2-ketonorbornane-5(or 6)-(disubstituted)methyl anhydride

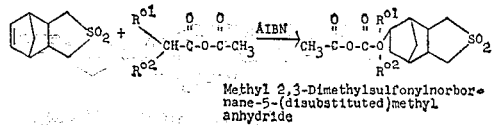

Methyl 2,3-Dimethylsulfonylnorbornane-5-(disubstituted)methyl anhydride

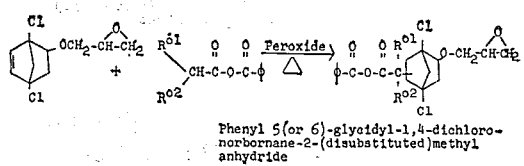

Phenyl 5(or 6)-glycidyl-1,4-dichloronorbornane-2-(disubstituted)methyl anhydride

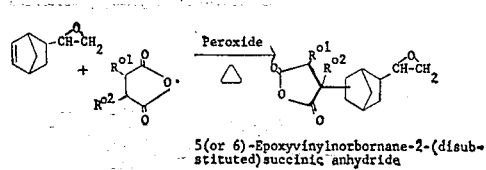

5(or 6)-Epoxyvinylnorbornane-2-(disubstituted)succinic anhydride

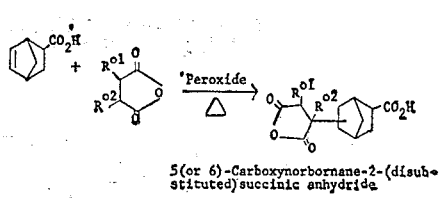

5(or 6)-Carboxynorbornane-2-(disubstituted)succinic anhydride

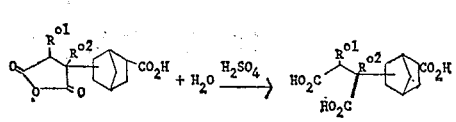

5(or 6)-Carboxynorbornane-2-(2,3-disubstituted)succinic acid

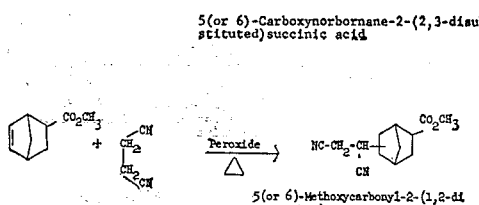

5(or 6)-Methoxycarbonyl-2-(1,2-dicyanoethyl)norbornane

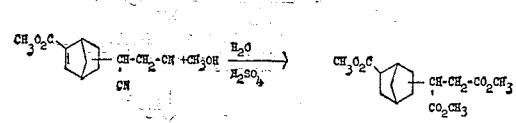

5(or 6)-Methoxycarbonyl-2-[1,2-dimethoxycarbonyl)ethyl]norbornane

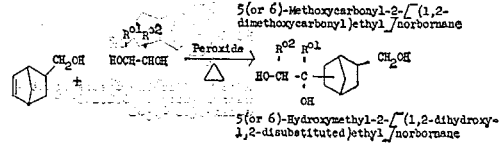

5(or 6)-Hydroxymethyl-2-[(1,2-dihydroxy-1,2-disubstituted)ethyl]norbornane

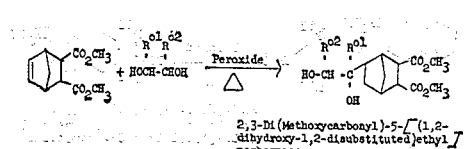

2,3-Di(methoxycarbonyl)-5-[(1,2-dihydroxy-1,2-disubstituted)ethyl]norbornane

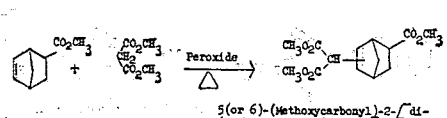

5(or 6)-(Methoxycarbonyl)-2-[di(methoxycarbonyl)methyl]norbornane

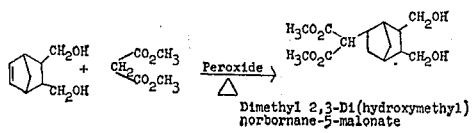

Dimethyl 2,3-Di(hydroxymethyl)norbornane-5-malonate

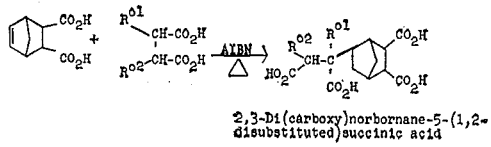

2,3-Di(carboxy)norbornane-5-(1,2-disubstituted)succinic acid

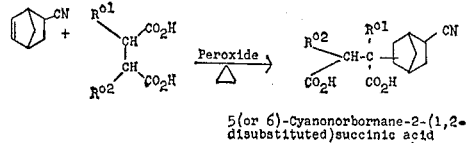

5(or 6)-Cyanonorbornane-2-(1,2-disubstituted)succinic acid

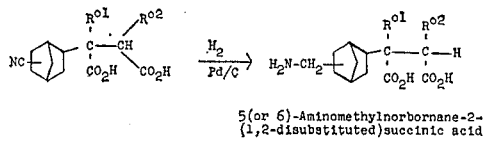

5(or 6)-Aminomethylnorbornane-2-(1,2-disubstituted)succinic acid

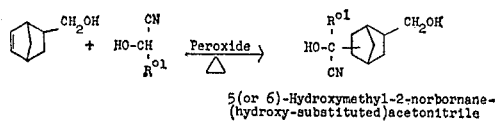

5(or 6)-Hydroxymethyl-2-norbornane-(hydroxy-substituted)acetonitrile

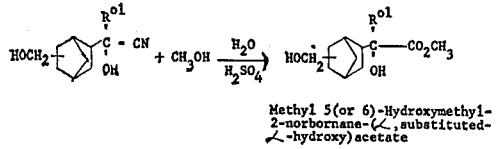

Methyl 5(or 6)-Hydroxymethyl-2-norbornane-(∠-substituted-∠-hydroxy)acetate

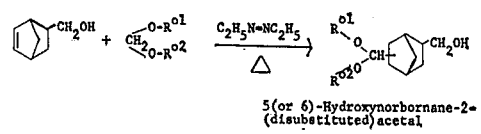

5(or 6)-Hydroxynorbornane-2-(disubstituted)acetal

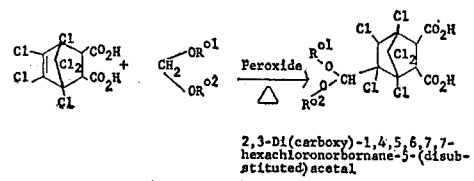

2,3-Di(carboxy)-1,4,5,6,7,7-hexachloronorbornane-5-(disubstituted)acetal

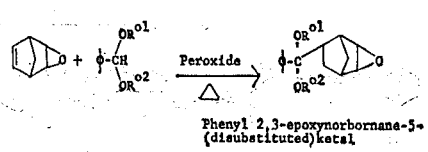

Phenyl 2,3-epoxynorbornane-5-(disubstituted)ketal

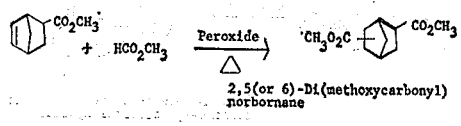

2,5(or 6)-Di(methoxycarbonyl)norbornane

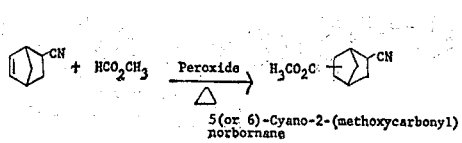

5(or 6)-Cyano-2-(methoxycarbonyl)norbornane

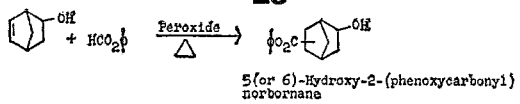
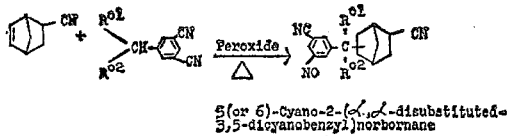
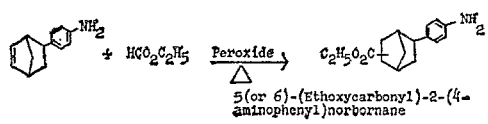
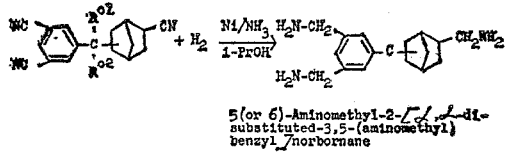
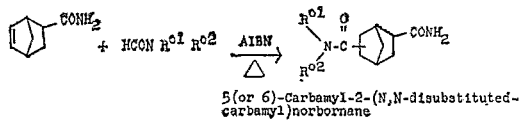
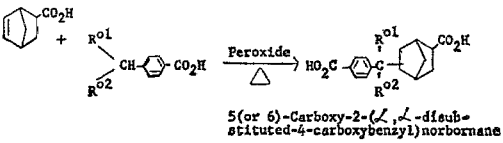
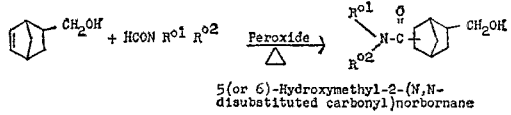
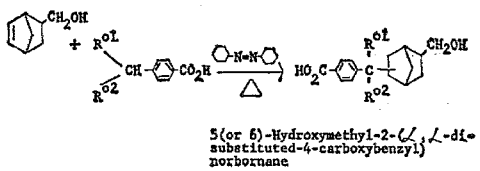
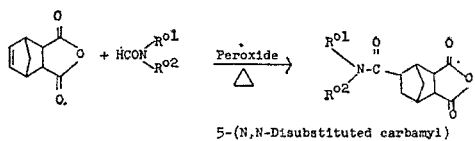
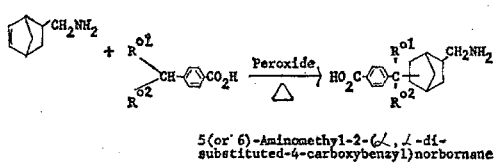
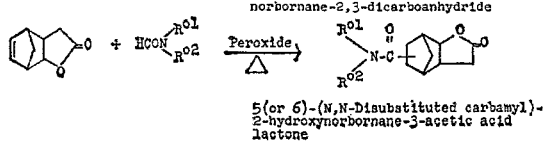
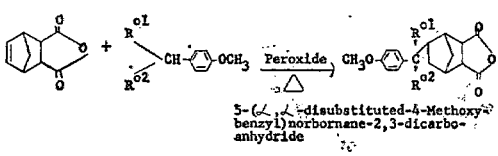
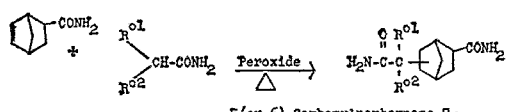
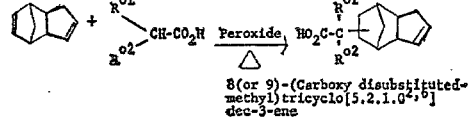
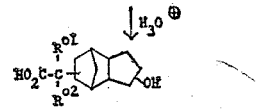
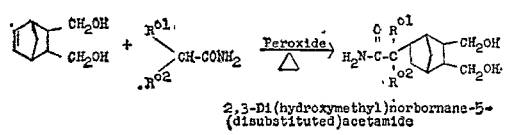
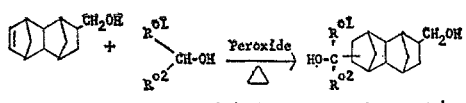
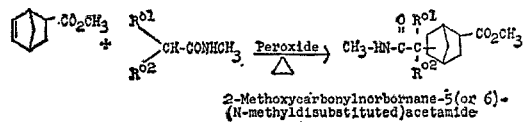
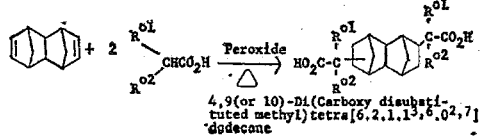
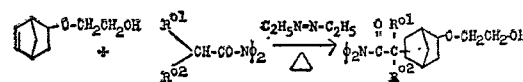
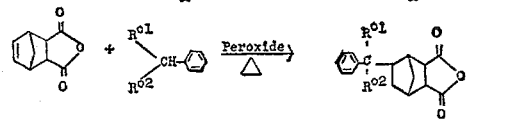
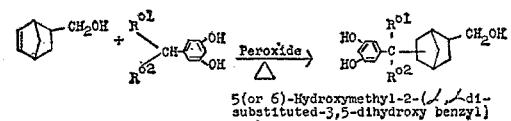

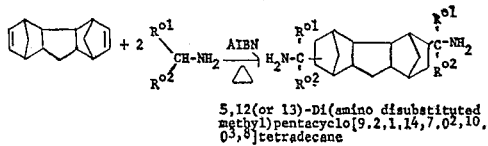
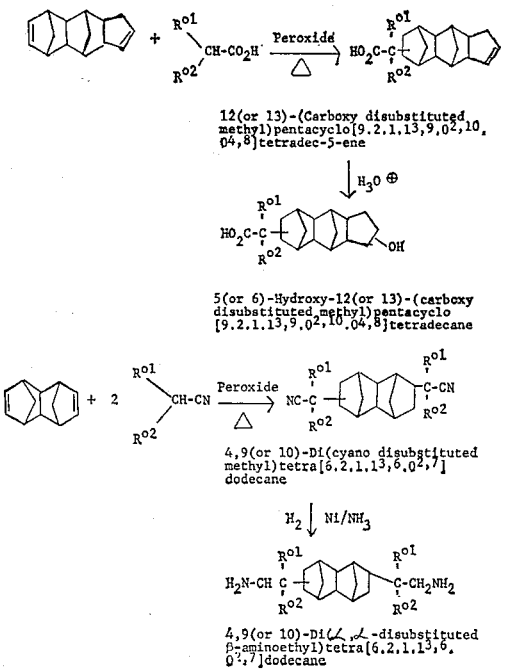
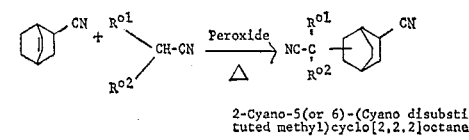
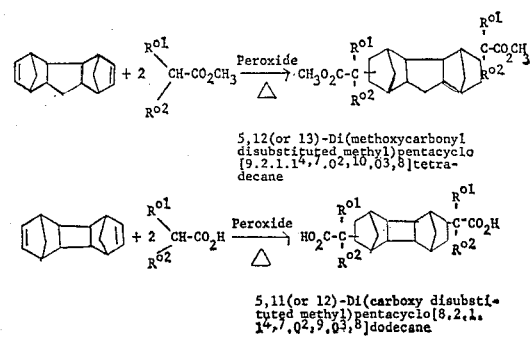
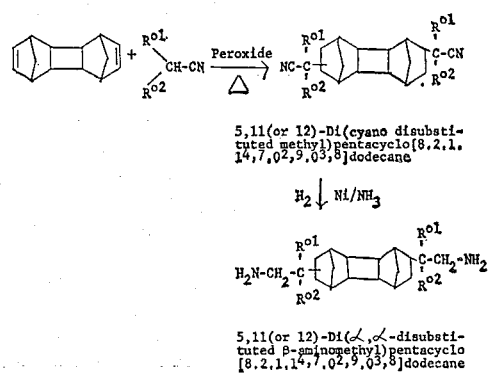

$R^{o1}$ and $R^{o2}$ may be hydrogen or an organic radical, such as the following illustrative radicals: lower alkyl (i.e., of from 1 to about 4 carbon atoms); phenyl; alkyl phenyl wherein the alkyl has from 1 to about 6 carbon atoms; carboxyphenyl; hydroxyphenyl; halophenyl (e.g., chloro, iodo, bromo, fluorophenyl); aminophenyl; cyanophenyl; isocyanatophenyl; carbamoylbenzyl; alkoxyphenyl; cyano; hydroxy; hydroxyalkyl of from 1 to about 8 carbon atoms; cyanoalkyl of from 1 to about 9 carbon atoms; amino; aminoalkyl of from 1 to about 8 carbon atoms; carboxy; carboxyalkyl of from 1 to about 9 carbon atoms; carbohydrocarbyloxy (i.e.,

wherein R′ is an alkyl group of from 1 to about 8 carbon atoms or phenyl); alkoxy of from 1 to about 8 carbon atoms, alkoxyalkoxy of from 3 to about 8 carbon atoms; alkoxy(polyalkyleneoxy) of from about 5 to about 1,200 carbon atoms; hydroxyalkoxyalkoxy of from 3 to about 8 carbon atoms; hydroxyalkoxy of from 2 to 8 carbon atoms; hydroxyalkoxy(polyalkyleneoxy) of from about 5 to about 1,200 carbon atoms; phenyloxy; phenyloxyalkoxy of from 8 to 10 carbon atoms; phenyloxy(polyalkyleneoxy) of from 10 to about 1000 carbon atoms; halophenyloxy wherein the halo substituents are described above; hydroxyphenyloxy; carboxyphenyloxy; alkoxyphenyloxy wherein the alkoxy moiety has from 1 to about 6 carbon atoms; aminophenyloxy; cyanophenyloxy; alkylphenyloxy wherein the alkyl moiety has from 1 to about 8 carbon atoms; carbamoylphenyloxy; alkanoyl (e.g.,

wherein R″ is an alkyl group of from 1 to about 6 carbon atoms); phenylcarbonyl; benzylcarbonyl; alkanoyloxy wherein the alkanoyl group contains from 1 to about 18 carbon atoms; phenoyloxy; benzoyloxy; alkylthio; phenylthio; benzylthio; mercapto; sulfo; sulfamido; 1,2-epoxyalkyl containing from 2 to about 8 carbon atoms.

Particularly desirable substituted norbornane compounds are produced in the following manner:

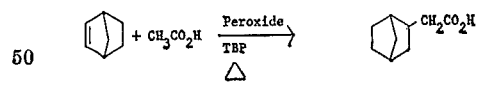
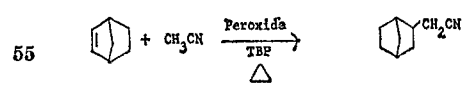
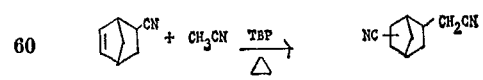
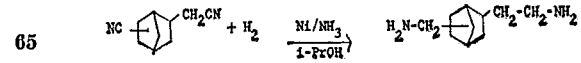
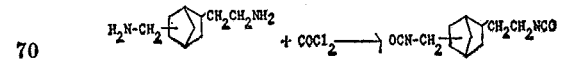
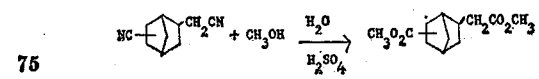

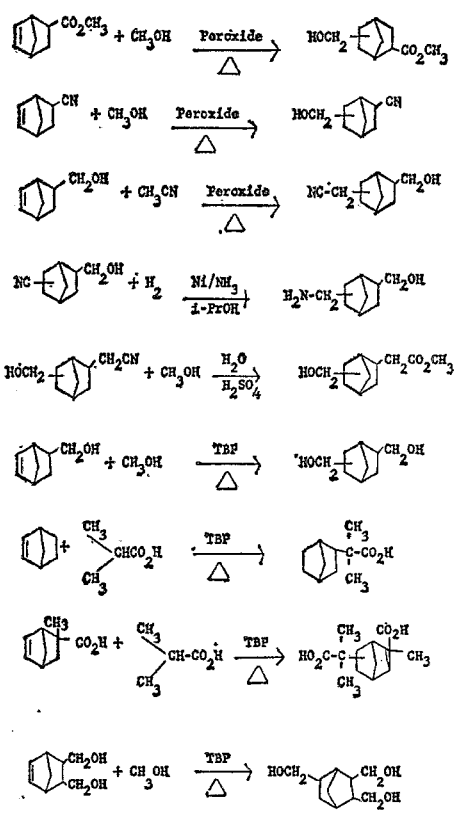

* TBP is the abbreviation for di-tert-butyl peroxide (also called tert.-butyl peroxide).

A unique feature of the novel process herein is its capability of producing poly-substituted norbornane wherein at least one of the substituents is in the *exo* configuration. This means that the poly-substituted norbornanes produced by the process of this invention readily enter into polymerization reactions with minimization of internal reaction. Moreover, the process of this invention can be employed to make poly-substituted (particularly di-substituted) norbornane unattainable by prior art processes.

A particularly preferred embodiment of this invention involves the production by the process of this invention of 2,5 and/or 2,6 di-substituted norbornanes characterized by the following formula:

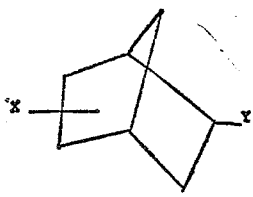

wherein X may be one of —$CR^IR^{II}CN$, —$CR^IR^{II}OH$, —$CR^IR^{II}CR^{III}R^{IV}NHR^V$, —$CR^IR^{II}COR^{VII}$, —$(CR^IR^{II})_nN{=}C{=}O$

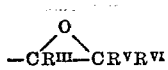

and —$CR^IR^{II}NR^{III}COR^{VII}$; $R^I$, $R^{II}$, $R^{III}$, $R^{IV}$, $R^V$ and $R^{VI}$ may each be one of amino, halogen (such as Cl, F, and Br), hydrogen and carbon bonded monovalent organic radicals such as alkyl of from 1 to about 18 carbon atoms, phenyl, benzyl, cycloalkyl of from about 5 to about 8 carbon atoms, carboxyalkyl of from 1 to about 10 carbon atoms, alkylcarboxyalkyl of from 2 to about 20 carbon atoms, cyanoalkyl of from 1 to about 10 carbon atoms, carboxyphenyl, carboxyphenylalkyl, wherein the alkyl radical contains from 1 to about 6 carbon atoms, aminoalkyl of from 2 to about 10 carbon atoms, carbamoylphenyl, phenylcarbamoylphenyl, halophenylcarbamoylphenyl, 7-naphthylcarbamoylphenyl, carbamoylalkyl of from 1 to about 9 carbon atoms, phenyl carbamoyl alkyl wherein the alkyl radical has from 1 to about 8 carbon atoms, isocyanatoalkyl of from 2 to about 7 carbon atoms, isocyanatomethylphenyl, isocyanatophenyl, isocyanatophenylmethylphenyl, hydroxyalkyl of from about 1 to 10 carbon atoms, hydroxyalkoxyalkyl of from about 3 to 5 carbon atoms, hydroxyphenyl, hydroxyphenylalkyl wherein the alkyl radical contains from 1 to about 5 carbon atoms, hydroxylpolyalkyleneoxyalkyl containing from 2 to about 20 alkyleneoxy radicals and the alkyl radical contains from 1 to about 4 carbon atoms, alkoxyalkyl containing from about 2 to about 11 carbon atoms, alkoxypolyalkyleneoxyalkyl containing from 2 to about 20 alkyleneoxy radicals and the alkyl radicals contain from 1 to about 4 carbon atoms, vicinalepoxyalkyl wherein the alkyl radical contains from 2 to about 8 carbon atoms, haloalkyl wherein the alkyl contains from 1 to about 8 carbon atoms and the halo radical is at least one of chloro, iodo, bromo, and fluoro, halo substituted phenyl wherein the halo substituent(s) is one of chloro, iodo, bromo, and fluoro and from 1 to 5 halo substituents are substituted on said phenyl radical, haloalkyl phenyl wherein the halo is one of those described above and the alkyl radical contains from 1 to about 4 carbon atoms, and the like organo radicals; and Y may be one of X with the exception of —$CR^IR^{II}OH$, and —CN, —OH, —$CR^IR^{II}NHR^V$, —$COR^{VII}$, and

—N=C=O wherein $R^{VII}$ may be one of chlorine, hydroxyl, alkoxy of from 1 to about 18 carbon atoms, phenyloxy, benzyloxy, cycloalkyloxy of from about 5 to about 8 carbon atoms, alkali metal oxide (such as lithium, sodium, potassium, cesium, rubidium), $NH_4^+$, quaternary ammonium oxide (+$NR^x_4O$, wherein $R^x$ is alkyl of from 1 to about 4 carbon atoms, phenyl and benzyl), and the like radicals; and $n$ is one of the integers 1 and 2.

The compounds encompassed by Formula II are formed by the Diels-Alder reaction between cyclopentadiene and a functionally substituted ethylenically unsaturated compound to produce 2-functionally substituted-5-norbornene followed by adding an aforedefined functionally substituted alkane to the functionally substituted norbornane by the above described process.

To illustrate, cyclopentadiene, i.e.,

can be reacted with a functionally substituted ethylenically unsaturated organic compound, such as

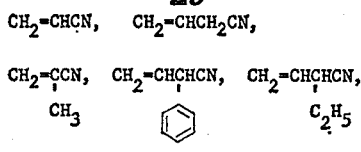
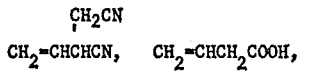
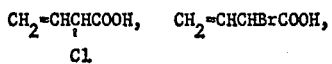
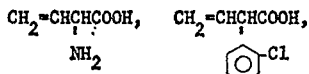
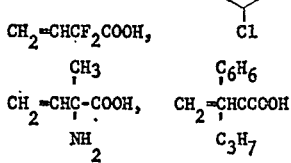
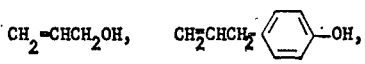
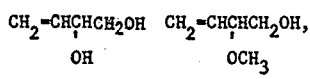
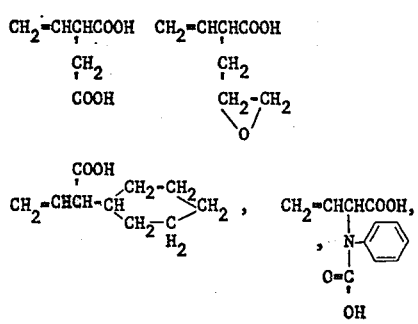
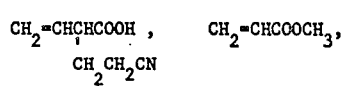

CH₂=CHCOOC₆H₁₂ ,    CH₂=CHCOOC₆H₅,
(hexylacrylate)    (phenyl acrylate)

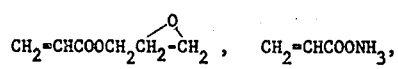
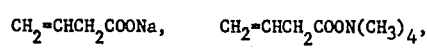
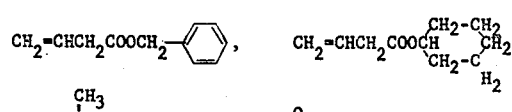
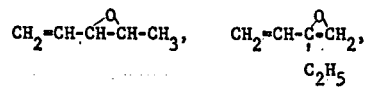

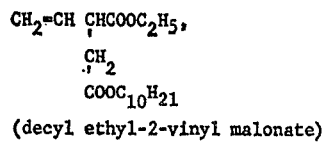
(decyl ethyl-2-vinyl malonate)

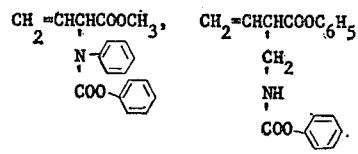

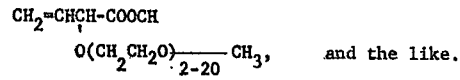
and the like.

The aminalkylnorbornane compounds may be produced by the hydrogenating a mono or polycyanoalkyl substituted norbornane. The mono or polyisocyanates can be produced by phosgenating mono or poly aminoalkyl substituted norbornane and then dehydrohalogenated the resulting chloroformate. Hydrolysis of the chloroformate results in a carbamic acid derivative. The above are well known procedures and are conventionally employed herein.

Illustrative functionally substituted alkanes in addition to those described previously, which are suitable for addition reaction with the *norbornenes* to produce the compounds of Formula II include, for example, the following:

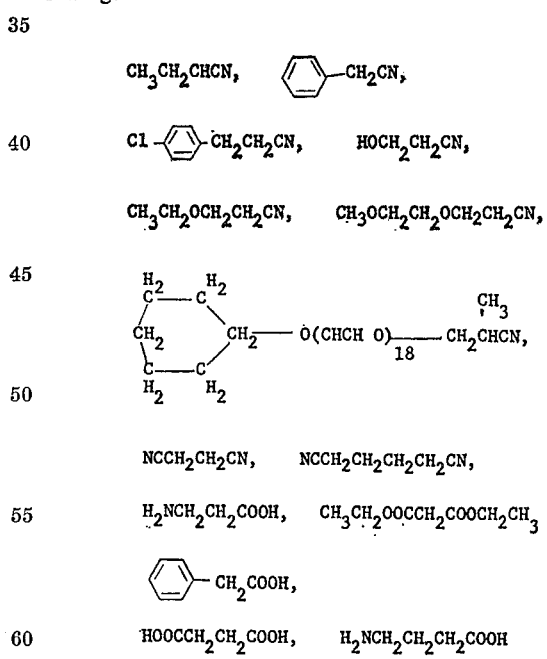

The novel disubstituted norbornane compounds defined by Formula II find a variety of uses and are particularly suitable in the manufacture of polymers which in turn can be used in the manufacture of fibers, films, coatings, molded objects, castings, and plasticizers. The polymers that are produced from the novel norbornanes depicted by Formula II are typically those which involve a condensation reaction or an addition reaction of the urethane type, viz., the reaction of an isocyanate and an active hydrogen compound, as determined according to the Zerewitinoff method described in the "Journal of the American Chemical Society," volume 48, page 3181 (1927). The polymer possess the recurring unit,

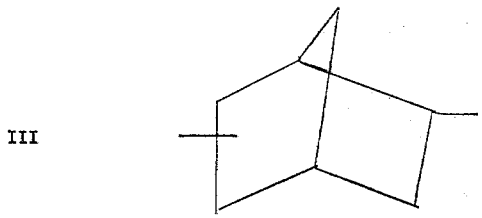

III i.e., the divalent norbornylene radical, within its internal structure.

The functional substituents on the norbornane ring determine the type of polymer which is formed. For example, if the functional substituents bear isocyanato radicals, the novel substituted norbornanes may be employed in the manufacture of polyurethanes, polyureas, mixtures of polyurethanes and polyureas, and 1,1-addition polyamides by reaction with itself or other isocyanates. The novel norbornanes bearing at least one carboxyl group may be employed in the manufacture of polyester compositions, polyamide compositions, as hardeners in the curing of epoxy compositions, and the like. The novel norbornane compounds encompassed by Formula II which contain at least one amido group, may be employed as a reactant to make polyamides, polyureas, act as a conventional amine hardener for epoxy resins, as reactant with alkylene oxides to form a polyalkylene amide adduct, as a reactant with aldehydes to form amine-aldehyde resins, and the like. The novel norbornane compounds which contain at least one hydroxyl group can be employed to manufacture polyesters, polycarbonates, alkylene oxide adducts, polyurethanes, and the like. The novel norbornane compounds within Formula II which bear at least one oxirane group may be employed in the formation of epoxy resins by acid or alkaline hydrolysis or by reaction with conventional epoxy hardeners, or may be employed as a precursor for hydroxyl-containing monomers by simple hydrolysis of the oxirane group.

The novel carbamates esters encompassed by Formula II (including the carbamic acid derivatives) may be employed in a manner similar to the carboxy derivatives described above to form polyureas, polyurethanes, and the like.

Thus, the divalent norbornane radical is joined through a linkage to other segments of the polymer structure. Such linkages include, by way of example, the ester linkage, that is, a linkage formed by joining the free valences of a carbonyloxy radical to carbon atoms; a carbonamide radical (—CONH—) where the free valences thereof are joined to carbon atoms; oxy radical, that is, an ether oxygen group where the divalence of the oxygen is directly joined to carbon atoms; urethane linkages, i.e., —NHCO—, where the free valences thereof are joined directly to carbon atoms; urea linkages, i.e.,

—NHCONH— where the free valences are directly joined to carbon atoms.

Such linkages are separated typically from the norbornane radical by at least one carbon atom which is directly joined to the norbornylene radical III.

The following discussion of specific illustrations of the types of polymers producible from the 2,5 and/or 2,6-norbornanes of Formula II is regarded only as illustrative of the products embraced by this invention and is not intended to limit the scope of this invention.

The diisocyanates of Formula II, illustrated by

may be reacted with active hydrogen containing compounds such as a polyol such as those of the following formula:

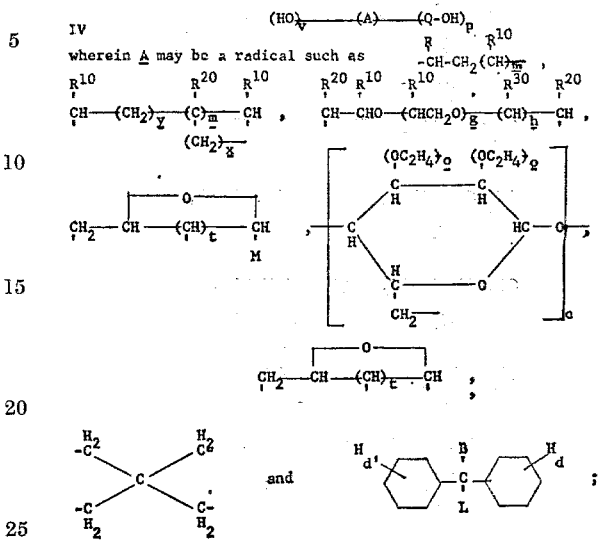

Q is bonded to A by an ether (—O—) bridge of an oxyalkylene radical and is at least one oxyalkylene radical, preferably at least two recurring oxyalkylene radicals, said oxyalkylene moieties having from 2 to 18 carbon atoms; preferably from 2 to 8 carbon atoms; $p$ is one of 0 and an integer of at least 1; $v$ is an integer equal to the free valence of the radical A minus the value of $p$; each $R^{10}$, $R^{20}$ and $R^{30}$ may be one of hydrogen, an alkyl group of from 1 to 18 carbon atoms, preferably from 1 to 4 carbon atoms, cycloalkyl of from 5 to 7 carbon atoms, or an aryl group; $y$ is an integer of from 1 to 10; $m$ is an integer of from 0 to 8; $g$ can be an integer of from 1 to 10; $h$ can be an integer of from 1 to 8; $x$ is one of the integers 0 to 1; $t$ is an integer of from 2 to 4; $c$ is a number having an average value of at least 2; M is a radical which can be alkyl, aralkyl,

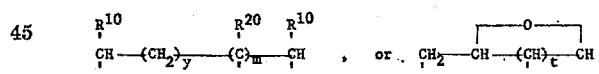

$o$ is one of the integers 0 of 1; B is hydrogen or an alkyl group of from 1 to 4 carbon atoms; L is B or

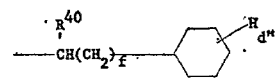

wherein the free valence of

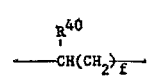

is the valence bond of L; $d$, $d'$ and $d''$ are each equal to 4 to 10; $f$ is either a value of 0 of 1; and $R^{40}$ is methyl when $f$ is 0 and hydrogen when $f$ is 1.

Polyols encompassed by the above Formula IV include those formed by the addition of alkylene oxides to an initiating polyhydroxy substituted organic compound in which the hydroxy substituents are bonded to carbon of the organic compound and the initiating polyhydroxy substituted organic compounds.

The result of such addition forms a hydroxylated alkylene oxide adduct of said hydroxy substituted organic compound. Thus, various 1,2-alkylene oxides such as ethylene oxide, 1,2-propylene oxide, 1,2-butylene oxide, 1,2-hexylene oxide, 1,2-dodecylene oxide, cyclohexyl ethylene oxide, and styrene oxide, or mixtures thereof, may be polymerized by contact with a basic or acidic catalyst in the presence of the initiating polyhydroxy organic compound. The aforementioned 1,2-alkylene oxides may be copolymerized with 1,3- and 1,4-alkylene oxides by acid catalytic polymerization in the presence of the initiating polyhydroxy organic compound. Illustrative of various 1,3- and 1,4-alkylene oxides include 1,3-propylene oxide, 1,4-butylene oxide (tetrahydrofuran), 1,4-pentylene oxide, 1,4-octylene oxide, etc., and 1,4-epoxy-2-phenyl butane, and the like. The 1,3- and 1,4-alkylene oxides may be reacted above with the initiating hydroxy compound to form useful polyols.

The initiating polyhydroxy organic compound include by way of example 1,2-alkylene glycol, 1,3-alkylene glycol, 1,4-alkylene glycol, alkylene triols, alkylene tetrols, alkylene pentols, alkylene hexols, polyalkylene glycols, etc. Illustrative of these materials include, ethylene glycol, 1,2- and 1,3-dihydroxypropane, 1,2-, 1,3-, 1,4-dihydroxypentane, 1,2-, 1,3-, 1,4-dihydroxyhexane 1,2-, 1,3-, 1,4-dihydroxydecane, 1,2-, 1,3-, 1,4-dihydroxyoctadecane, and the alpha, omega diols of the above hydrocarbon moieties not indicated as such. Polyalkylene glycols include, diethylene glycol, triethylene glycol, tetraethylene glycol, 1,2- and 1,3-dipropylene glycol, 1,2- and 1,3-tripropylene glycol, 1,3-, 1,4- and 1,4-dibutylene glycol, 1,2-, 1,3- and 1,4-tributylene glycol, etc. Triols which may be utilized as the initiating hydroxy organic compound include, glycerol, 1,1,1 - trimethylolpropane, 1,2,3 - trihydroxybutane, 1,2,3-trihydroxypentane, 1,2,3-trihydroxyoctane 1,2,3-trihydroxydecane, 1,2,4 - trihydroxybutane, 1,2,4-hydroxyhexane, 1,2,6-trihydroxyhexane, 1,2,8-trihydroxyoctane, and the like. Illustrative of other polyols which are suitable initiators include 2,5- or 2,6-bis(hydroxymethyl)norbornane, sorbitol, pentaerythritol, erythritol, aromatic hydroxy compounds of the formulae:

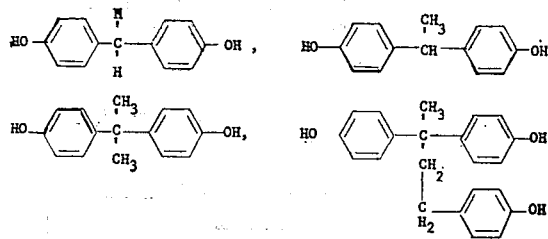

and the like, and the saturated (non-benzenoid) derivatives thereof; various other carbohydrates such as the monosaccharides and polysaccharides, e.g., cellulose; starch; glucosides, such as the lower alkyl (1 to 6 carbon atoms) glucosides, e.g., methyl-D-arabinoside, methyl-D-xyloside, ethyl-D-yloside, i-butyl-O-riboside, methyl, ethyl, propyl, butyl, and 2-ethylhexyl-D-glycoside, 2-ethylhexyl-D-fructoside, isobutyl-D-mannoside, ethyl-D-galactoside, benzyl-D-glycoside and methyl-L-rhammoside, sucrose; glycose glycoside; maltose; lactose; D-gulose, D-idose, hydroxyethyl cellulose; amylose; amylopectin; dextrin; and the like.

In making the addition products of epoxy and polyhydroxy compound, the initiator is admixed with the alkylene oxide in a liquid phase and the basic or acidic catalyst is dispersed throughout this phase. Suitable basic catalysts include, alkali metal hydroxides such as sodium hydroxide and potassium hydroxide. Desirable acidic catalysts include Lewis acids such as boron trifluoride, aluminum chloride, and the like. The catalyst is added in catalytic amounts, i.e., amounts sufficient to effect reaction between the alkylene oxide and the initiating hydroxylated compound. When the catalyst is alkali metal hydroxide, amounts of from about 0.2 to 1.0 percent by weight of the alkylene oxide reactant is convenient. When the catalyst is a Lewis acid, such as boron trifluoride, amounts of from about 0.01 to 1.0 percent by weight of the alkylene oxide reactant is suitable. The reaction can be effected at temperatures of from 80° C. to about 160° C. and advantageously under pressures ranging from about 5 to 50 pounds per square inch gauge. The reaction is preferably carried out under essentially moisture free (anhydrous) conditions to minmize side reaction. The addition of the alkylene oxide is terminated when the calculated quantities thereof have been introduced into the system.

In addition, the above polyisocyanates may be reacted with organo polyesters which desirably possess residual hydroxy groups. These polyesters may be branched and/or linear. Branched-chain polyesters include those which are of the cross-linked variety. Moreover, the term polyester is meant to include polyestramides which possess not only recurring ester linkages, but also recurring amide linkages. Such polyesters and polyesteramides are obtained by the reaction of an organic polycarboxylic acid and an organic polyol and/or an organic hydroxyl amine, or from polymerization of an alpha, omega-hydroxyorganocarboxylic acid and/or the corresponding alpha, omega-organolactone, e.g., epsilon caprolactone.

Illustrative of the polycarboxylic acids include, e.g., oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, muconic acid, alpha-dihydromuconic acid, beta-dihydromuconic acid, diglycolic acid, dilactic acid, thiodiglycolic acid, 4 - amyl - 2,5 - heptadienedioic acid, 3-hexynedioic acid, 1,2-cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 1,2,3-propanetricarboxylic acid, 1,2,4 - benzenetricarboxylic acid, 1,3,5 - benzene tricarboxylic acid, 3 - hexene-1,2, 3,4-tetracarboxylic acid, 1,2,3,4 - benzenetetracarboxylic acid, 1,2,3,5-benzenetetracarboxylic acid, benzenepentacarboxylic acid, benzenehexacarboxylic acid, and the like.

The anhydride and acyl halides of the above polycarboxylic acids may also be employed when such are available. The polyols which may be reacted with the polycarboxylic acids to form the polyesters include, for example, the alkylene oxide adducts or the initiating polyhydroxy substituted organic compounds per se described above. Hydroxy amines which may be employed include, ethanol amine, 3 - aminopropanol, 4 - aminopropanol, 5 - aminopentanol, 6 - aminohexanol, 10 - aminodecanol, 6-amino - 5 - methyl hexanol-1, p-hydroxymethylbenzylamine, and the like.

The lactone polyesters which contain free hydroxyl group(s) and/or carboxyl group(s) represent extremely preferred active hydrogen containing compounds. These lactone polyesters are formed by reacting, at an elevated temperature, for example, at a temperature of from about 50° C. to about 250° C., an admixture containing a lactone and an organic initiator; said lactone being in molar excess with relation to said initiator; said lactone having from six to eight carbon atoms in the lactone ring and at least one hydrogen substituent on the carbon atom which is attached to the oxy group in said ring; said organic initiator having at least one reactive hydrogen substituent preferably of the group of hydroxyl, primary amino, secondary amino, carboxyl, and mixtures thereof, each of said reactive hydrogen substituents being capable of opening the lactone ring whereby said lactone is added to said initiator as a substantially linear group thereto; said initiated lactone polyesters possessing, on the average, at least two of said linear groups, each of said linear groups having a terminal oxy group at one end, a carbonyl group at the other end, and an intermediate chain of from five to seven carbon atoms which has at least one hydrogen substituent on the carbon atom in said intermediate chain that is attached to said terminal oxy group. The aforesaid polyesters will hereinafter be referred to, in the generic sense, as "initiated lactone polyesters" which term will also include the various "copolymers" such as lactone copolyesters, lactone polyester/polycarbonates, lactone polyester/polyethers, lactone polyester/polyether/polycarbonates, lactone polyester/polyester, etc. These initiated lactone polyesters will contain at least one hydroxyl group and/or at least one carboxyl group depending, of course, on the initiator and reactants employed. Those initiated lactone polyesters which contain at least three alcoholic hydroxyl groups will be referred to as "initiated lactone polyester polyols"; those with two alcoholic hydroxyl groups will be termed "initiated lactone polyester diols." On the other hand, the initiated lactone polyesters which contain at least two carboxyl groups will be referred to as "initiated polycarboxy lactone polyesters."

The preparation of the aforesaid hydroxyl-containing and/or carboxyl-containing initiated lactone polyesters can be effected in the absence or presence of an ester interchange catalyst to give initiated lactone polyesters of widely varying and readily controllable molecular weights without forming water of condensation. These lactone polyesters so obtained are characterized by the presence of recurring linear lactone units, that is, carbonylalkyleneoxy

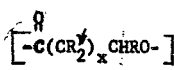

wherein $x$ is from 4 to 6, and wherein the $R^y$ variables have the values set out in the next paragraph.

The lactone used in the preparation of the initiated lactone polyesters may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

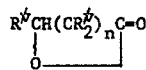

in which $n$ is at least four, for example, from four to six, at least $n+R$'s are hydrogen, and the remaining R's are substituents selected from the group consisting of hydrogen, alkyl, cycloalkyl, alkoxy and single ring aromatic hydrocarbon radicals.

The lactones which are preferred in the preparation of the hydroxyl-containing initiated lactone polyesters are the epsilon-caprolactones having the general formula:

wherein at least six of the $R^y$ variables are hydrogen and the remainder may each be one of hydrogen, alkyl, cycloalkyl, alkoxy, or single ring aromatic hydrocarbon radicals, none of the substituents contain more than about twelve carbon atoms, and the total number of carbon atoms in the substituents on the lactone ring does not exceed about twelve.

Among the substituted epsilon-caprolactones considered most suitable are the various monolkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone can be employed as starting material. Mixtures comprising the $C_6$ to $C_8$ lactones illustrated previously, with/without, for instance, the alpha,alpha-disubstituted-beta-propiolactones, e.g., alpha, alpha-dimethyl-beta-propiolactone, alpha,alpha - dichloromethyl - beta - propiolactone, etc.; with/without, for instance, oxirane compounds, e.g., ethylene oxide, propylene oxide, etc.; with/without, for instance, a cyclic carbonate, e.g., 4,4-dimethyl-2,6-dioxacyclohexanone, etc.; are also contemplated.

Among the organic initiators that can be employed to prepare the initiated lactone polyesters include the carboxyl-containing, hydroxyl-containing, and/or amino-containing compounds illustrated previously, e.g., those compounds which have at least one reactive hydrogen substituent as determined according to the Zerewitinoff method.

The initiator is believed to open the lactone ring to produce an ester or amide having one or more terminal groups that are capable of opening further lactone rings and thereby adding more and more lactone units to the growing molecule. Thus, for example, the polymerization of epsilon-caprolactone initiated with an amino alcohol is believed to take place primarily as follows:

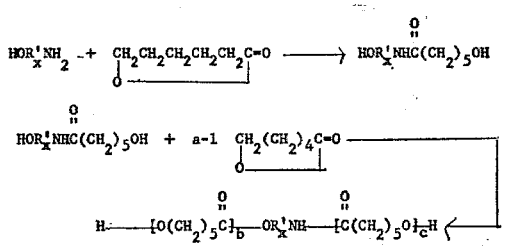

wherein $R'_x$ (of the initiator and the resulting initiated lactone polyester product) is an organic radical such as an aliphatic, cycloaliphatic, aromatic, or heterocyclic radical, and wherein $a=b+c$.

The reaction of a carboxyl-containing initiator with epsilon-caprolactone is beileved to proceed as follows:

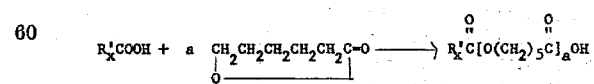

It will be appreciated from the preceding illustrative equations that where a plurality of lactone units are linked together, such linkage is effected by monovalently, bonding the oxy (—O—) moiety of one unit to the carbonyl $$(-\overset{O}{\underset{\|}{C}}-)$$

moiety of an adjacent unit. The terminal lactone unit will have a terminal hydroxyl or carboxyl end group depending, of course, on the initiator employed.

The preparation of the initiated lactone polyester can be carried out in the absence of a catalyst though it is preferred to effect the reaction in the presence of an ester exchange catalyst. The organic titanium compounds that are especially suitable as catalysts include the tetraalkyl titanates such as tetraisopropyl titanate and tetrabutyl titanate. Additional preferred catalysts include, by way of further examples, the stannous diacylates and stannic tetraacylates such as stannous dioctanoate and stannic tetraoctanoate. The tin compounds, the organic salts of lead and the organic salts of manganese which are described in U.S. 2,890,208 as well as the metal chelates and metal acylates disclosed in U.S. 2,878,236 also represent further desirable catalysts which can be employed. The disclosures of the aforesaid patents are incorporated by reference into this specification.

The catalysts are employed in catalytically significant concentration. In general, a catalyst concentration in the range of from about 0.0001 and lower, to about 3, and higher, weight percent, based on the weight of total monomeric feed, is suitable. The lactone polymerization reaction is conducted at an elevated temperature. In general, a temperature in the range of from about 50° C., and lower, to about 250° C. is suitable; a range from about 100° C. to about 200° C. is preferred. The reaction time can vary from several minutes to several days depending upon the variables illustrated immediately above. By employing a catalyst, especially the more preferred catalysts, a feasible reaction period would be about a few minutes to about 10 hours, and longer.

The polymerization reaction preferably is initiated in the liquid phase. It is desirable to effect the polymerization reaction under an inert atmosphere, e.g., nitrogen.

The preparation of the lactone polyesters via the preceding illustrative methods has the advantage of permitting accurate control over the average molecular weight of the lactone polyester products and further of promoting the formation of a substantially homogeneous lactone polyester in which the molecular weights of the individual molecules are reasonably close to the average molecular weight, that is, a narrow molecular weight distribution is obtained. This control is accomplished by preselecting the molar proportions of lactone and initiator in a manner that will readily be appreciated by those skilled in the art. Thus, for example, if it is desired to form a lactone polyester in which the average molecular weight is approximately fifteen times the molecular weight of the initial lactone, the molar proportions of lactone and initiator utilized in the polymerization reaction are fixed at approximately 15:1 inasmuch as it is to be expected that on the average there will be added to each molecule of initiator approximately fifteen lactone molecules.

The initiated lactone polyesters which are contemplated have average molecular weights as low as 300 to as high as about 7000, and even higher still to about 9000. With vinyl polymers containing a plurality of active hydrogen substituents, e.g., hydroxyl, amino, etc., as initiators, the average molecular weight of the initiated lactone polyesters can easily go as high as 14,000, and higher. Generally, however, the average molecular weight of the initiated lactone polyester is from about 300 to about 9000, preferably from 600 to about 5000.

Also included within the term and scope of the initiated lactone polyesters are those in which the linear lactone units need not necessarily be connected directly to one another. This is readily accomplished, for example, by reacting lactone(s) with combinations of initiators such as dibasic acid(s) plus glycol(s), diamine(s) or amino alcohol(s) such as those exemplified previously. This reaction can be effected at an elevated temperature, e.g., about 100° C. to about 200° C., with all the reactants present, or the reaction of the dibasic acid with the glycol, diamine, or amino alcohol can be accomplished first, and then the resulting amino-, hydroxyl-, or carboxyl-containing products (depending on the reactants and the concentration of same) can be reacted with the lactone to yield hydroxyl-terminated and/or carboxyl-terminated initiated lactone polyesters. Moreover, as also indicated previously, the term and the scope of the hydroxyl- and/or carboxyl-containing initiated lactone polyesters includes the "oxyalkylene-carboxyalkylenes" such as described in U.S. Pat. No. 2,962,524 which are incorporated by reference into this disclosure. In addition, the term and scope of the hydroxyl-containing initiated lactone polyesters also includes the reaction of an admixture comprising a $C_6$–$C_8$ lactone(s), a cyclic carbonate(s), and an initiator having at least one group, preferably at least two groups, of the class of hydroxyl, primary amino, or secondary amino, or mixtures thereof, under the operative conditions discussed above. Exemplary cyclic carbonates include 4,4-dimethyl-2,6-dioxacyclohexanone, 4,4 - dichloromethyl - 2,6 - dioxacyclohexanone, 4,4 - dicyanomethyl - 2,6 - dioxacyclohexanone, 4,4 - diethyl - 2,6 - dioxacyclohexanone, 4,4 - dimethoxymethyl - 2,6 - dioxacyclohexanone; and the like. Consequently, where a mixture of linear lactone units (i.e.,

units which are properly termed carbonylalkyleneoxy) and linear carbonate units (i.e.,

units which can be termed carbonyloxyalkyleneoxy) are contained in the polymer chain or backbone, the carbonyl moiety of one linear unit will be monovalently bonded to the oxy moiety of a second linear unit. The oxy moiety of a terminal linear unit will be bonded to a hydrogen substituent to thus form a hydroxyl end group. Moreover, the point of attachment of the initator and a linear unit (lactone or carbonate) will be between the carbonyl moiety of said unit and the functional group (hydroxyl or amino) of said initiator minus the active hydrogen of said group.

Additional initiated lactone polyesters include those which contain at least about 50 mol percent of carbonylpentamethyleneoxy units therein

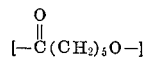

and which possess an average molecular weight of from about 500 to about 5000, particularly from about 600 to about 4000. The remaining portion of the molecule can be comprised of, in addition to the initiator, essentially linear units derived from a cyclic carbonate especially those illustrated previously; an oxirane compound especially ethylene oxide, propylene oxide, and/or butylene oxide; a mono- and/or polyalkyl-substituted epsilon-caprolactone especially the mono- and/or polymethyl and/or ethyl-substituted epsilon-caprolactones; and/or an alpha, alpha-disubstituted-beta-propiolactone especially those exemplified previously. The so-called initiated lactone homopolyesters derived from reacting epsilon-caprolactone with an initiator are likewise included within the preferred lactone polyesters. The initiated lactone polyester polyols, and in particular, the substantially linear initiated lactone polyester diols, are exceptionally preferred.

Reaction between the polyisocyanates and the active hydrogen-containing organic compounds may be effected at temperatures ranging from 0° C. to 250° C. preferably from 25° C. to 150° C. The reaction is effected by intermixture of the components of the reaction, followed by heating of the mixture, if necessary.

The above reaction between the polyisocyanate of this invention and the polyols and/or polyesters described above may be employed to produce cross-linked infusible solid resins, substantially linear fusible (or heat softenable) solid resins, to short chain length viscous liquids. Such is achieved by proper selection of the polyol reactant, the degree of polymerization, the ratio of reactants to each other (polyol vs. diisocyanate), and the like considerations.

A particularly useful polymer is a polyurethane-polyurea obtained by the reaction of a diisocyanate encompassed by Formula II and the initiated lactone polyester polyols, described above, to form a prepolymer having a molecular weight not in excess of about 10,000, preferably from about 400 to about 5,000. This prepolymer may be isocyanate end-blocked or hydroxyl end-blocked depending on which reactant is employed in stoichiometric excess. If hydroxyl end-blocked, the prepolymer is reacted with additional diisocyanate to form an isocyanate end-blocked product.

With addition of further diisocyanate, or to the already isocyanate end-blocked polymer, may be added a poly-nitrogen compound possessing at least one hydrogen bonded to each nitrogen atom. Illustrative poly-nitrogen compounds are, e.g., hydrazine, hydrazine hydrate, symmetrical-dimethyl substituted hydrazine, symmetrical-diphenyl substituted hydrazine, alkylene diamines such as ethylene diamine, trimethylene diamine, tetramethylene diamine, pentamethylene diamine, hexamethylene diamine, and the like, cycloaliphatic diamines such as 2,5 or 2,6-bis-(aminomethyl)norbornane, 2-aminomethyl-5(or 6)-(2-aminoethyl) norbornane, 1,4-bis(aminomethyl) cyclohexane, 1,4-diaminocyclobutane, and the like.

On reaction of the poly-nitrogen compound with the poly-isocyanate end-blocked polyester, the polyester is chain extended to form a film and fiber-forming elastomeric polymer having a molecular weight typically in excess of 5,000, preferably in excess of 10,000. These polymers can be dissolved in such active solvents as dimethylformamide, dimethylacetamide, tetrahydrofuran, dioxane, and the like to allow extrusion, knife coating, casting, or roller coating to form films or wet spun into a non-solvent (e.g., water) to form fibers and filaments.

The urethane reaction can be induced by use of catalysts such as the polyurethane foam catalyst described below.

The above polyisocyanates can be employed to make foams from the aforementioned polyol reactants. The molecular weight and the hydroxyl number of the polyol when used for reaction with a polyisocyanate to form polyurethane foams will determine whether the resulting foam product is flexible or rigid. For example, the above polyols which possess a hydroxyl number of from about 200 to about 1000 are typically employed in rigid foam formulations, while those polyols having a hydroxyl number of from about 20 to about 150 or more are usually employed in flexible foam formulations. Such limits are not intended to be restrictive and are merely illustrative of the potential selectivity of the above polyol co-reactants. Other modifications of possible polyol combinations will be readily apparent to those having ordinary skill in the art.

The hydroxyl number, as used hereinabove, is defined by the equation:

$$OH = \frac{f \times 1000 \times 56.1}{\text{molecular weight}}$$

wherein OH is the hydroxyl number of the polyol, $f$ represents functionality (i.e., average number of hydroxyl groups per molecule of polyol), and molecular weight is the average molecular weight of the polyol.

Methods for making the aforementioned polyurethane flexible foams are well documented in the art.

When preparing the foamed products, either the quasi-prepolymer technique or the one-shot technique can be employed. Both techniques are known in the art.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-hydroxyl reaction or by a combination of the two methods. All of these methods are known in the art. The preferred blowing agents are certain halogen-substituted aliphatic hydrocarbons which have boiling points between about −40° C. and 70° C., and which vaporize at or below the temperature of the foaming mass. These blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro - 1,2,2-trichloroethane, chloropentafluoroethane, 1,1,1 - trifluoro - 2-chloroethane, 1-chloro-1-fluoroethane, 1,1,1 - trichloro - 2,2,2 - trifluoroethane, 1,1,2-trichloro-1,2,2-trifluoroethane, 1-chloro-2-fluoroethane, 2-chloro-1,1,1,2,3,3,4,4,4 - nonafluorobutane, hexafluorocyclobutane, and octafluorocyclobutane.

Other useful blowing agents include low-boiling hydrocarbons such as butane, pentane, hexane, cyclohexane, and the like. Many other compounds easily volatilized by the exotherm of the isocyanate-hydroxyl reaction can also be employed. A further class of blowing agents includes thermally-unstable compounds which liberate gases upon heating, such as N,N'-di-methyl-N,N'-dinitrosoterephthalamide.

The amount of blowing agent used will vary with the density desired in the foamed product. In general, it may be stated that for 100 grams of reaction mixture containing an average NCO/OH ratio of about 1:1, about 0.005 to 0.3 mole of gas is used to provide foams having densities ranging from 30 to 0.8 pound per cubic foot, respectively.

A conventional catalyst can be employed in the reaction mixture for accelerating the isocyanate-hydroxyl reaction. Such catalysts include a wide variety of compounds such as, for example, (a) tertiary amines such as trimethylamine, 1,2,4-trimethylpiperazine, 1,4-dimethylpiperazine, N-methylmorpholine, N-ethylmorpholine, N,N-dimethylbenzylamine, bis(dimethylaminomethyl)amine, N,N-dimethylethanolamine, N,N,N',N' - tetramethyl-1,3-butanediamine, triethanolamine, 1,4-diazabicyclo [2.2.2] octane, and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone - 2 - carboxylate, acetylacetoneimine, bis-acetylacetonealkylenediamines, salicylaldehydeimine, and the like; with various metals such as Be, Mg, Zn, Cd, Pb, Ti, Zr, Sn, Sb, As, Bi, Cr, Mo, Mn, Fe, Co, Ni, or such ions as $MoO_2^{++}$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of these alcoholates with carboxylic acids, beta-diketones and 2-(N,N-dialkylamino) alkanols, such as the well known chelates of titanium obtained by said or equivalent procedures; (g) salts of organic acids with a variety of metals such as alkali metals, alkaline earth metals, Al, Sn, Pb, Sb, Mn, Co, Ni and Cu, including, for example, sodium acetate, potassium laurate, calcium hexanoate, stannous acetate, stannous octoate, stannous-2-ethyl-hexanoate, stannous oleate, lead octoate, metallic driers such as manganese and cobalt naphthenate, and the like; (h) organometallic derivatives of tetravalent tin, trivalent and pentavalent As, Sb and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis[4-(N,N'-dimethylamino)benzoate], dibutyltin-bis[6-(N-methylamino)caproate], and the like. Similarly, there can be used a trialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-diethylaminopentylate), dibutyltin dichloride, dioctyltin dichloride, and the like.

The tertiary amines may be used as primary catalysts for accelerating the active hydrogen-isocyanate reaction or as secondary catalysts in combination with metal catalysts. The catalysts are employed in small amounts, for example from about 0.001 percent to about 5 percent, based on the weight of the reaction mixture.

It is also desirable to employ small amounts, e.g., about 0.001 percent to 5.0 percent by weight, based on the total reaction mixture, of an emulsifying agent such as siloxane-oxyalkylene block copolymer having from about 10 to 80 percent by weight of siloxane polymer and from 90 to 20 percent by weight of alkylene oxide polymer, such as the block copolymers described in U.S. Pats. Nos. 2,834,748 and 2,917,480.

Another class of useful emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon to silicon bonds, rather than through carbon to oxygen to silicon bonds. The copolymers generally contain from 5 to 95 weight percent, and preferably from 5 to 50 weight percent of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed the foam products of the invention can be prepared without emulsifiers in some cases.

Further polyurethanes which deserve mention here are those which are formed by the reactions of the aforementioned diisocyanates, encompassed by Formula II, with alkyd resins such as the polyester reaction product of unsaturated or saturated fatty acids (such as linoleic and stearic acid) with the hydroxyl containing polyester reaction product of maleic or phthalic acid and glycerol to make useful coating resins. The alkyd resins may also be formed by the cooking of vegetable or fish oils such as linseed oil, soybean oil, cottonseed oil, codliver oil, tung oil, and the like, with maleic acid, or its acid chloride and esters. The resulting alkyd reaction product is then intermixed and reacted with the aforementioned diisocyanate to produce a polyurethane-based varnish.

Illustrative of polyesters employing the compounds of Formula II are those which are formed from the esterification reaction between the acid, ester or acid chloride substituted norbornanes encompassed by Formula II and the aforementioned polyols. The reaction may be effected in the presence of an acid or alkaline catalyst of the conventional type. These polyesters range in properties from hard brittle solids to very flexible or soft plasticizing materials. For example, polyesters formed from the reaction of 2-carboxymethyl-5(or 6)-carboxynorbornane and 2,5(or 6)-bis(hydroxymethyl)norbornane are excellent coating resins which are very flexible but relatively high melting films. This polyester can be melt extruded in the form of filaments and fibers. A most desirable polyester is one obtained from the aforementioned dicarboxylic acid and Bisphenol A (2,2-bis(4-hydroxyphenyl)-propane). This polyester is exceptionally high melting and forms very useful films and fibers. An additional polyester which possesses very useful properties is that formed by the reaction of the aforementioned dicarboxylic acid and 1,4-bis(hydroxymethyl)cyclohexane. This polyester possesses most suitable fiber-forming and film-forming qualities.

Another class of polyesters which can be manufactured utilizing diol reactants embodied by Formula II above include the reaction product of terephthalic acid, its acid chlorides and diesters and the aforementioned diol such as 2,5(or 6)-bis(hydroxymethyl)norbornane, 2-hydroxymethyl-5(or 6)-hydroxethyl norbornane, and the like. The latter norbornane diol is much preferred providing, after reaction, most desirable fiber-forming and film-forming polyesters.

The aforementioned diamines and dicarboxylic acids, acid chlorides and diesters as embodied in Formula II may be interreacted to form very useful polyamides of the nylon type. In addition, the novel dicarboxylic acids, acid chlorides and diesters may be reacted with other diamines such as ethylene diamine, tetramethylene diamine, hexamethylene diamine, octamethylene diamine, 1,4-phenylene diamine, 1,4-diaminocyclohexane, piperazine, N,N'-dimethylethylene diamine and the like. The resulting polyamides, which can be produced by solid state, melt, solution or interfacial polymerization techniques, are suitable for making coatings, films and fibers or filaments. On the other hand, the diamines embodied within Formula II such as 2,5(or 6)-bis(aminomethyl)norbornane or 2-aminomethyl-5(or 6)-aminoethyl norbornane, preferably the latter, can be reacted with the aforementioned dicarboxylic acids including the norbornane dicarboxylic acid to produce suitable coating resins, film-forming and fiber-forming compositions utilizing conventional polymerization procedures. The term "interfacial polymerization" as applied above, is that type of polymerization in which the dicarboxylic acid component, or its derivatives such as the acid chlorides, and the diamines are each dissolved in different solvents, which solvents are immisicible in each other and the reaction proceeds at the immiscible solvent interface. This can be done by utilizing separate solvent layers or through a type of emulsification of at least one solvent phase in another solvent phase.

The polyamino substituted norbornane compounds embodied within Formula II can be used as an epoxy hardener utilizing conventional procedures. By epoxy hardener, it is meant that the diamine reacts with oxirane groups of a polyepoxide resin whereby to act as a chain extender between the epoxide molecules to form a high molecular weight resin. Suitable epoxides include those encompassed by Formula II above as well as the diglycidyl ether of 2,2-bis(4-hydroxyphenyl)propane, as well as its condensation product, dicyclopentadiene dioxide, 3,4-epoxy-6-methylcyclohexylmethyl-3,4-epoxy-6-methylcyclohexanecarboxylate, and the like. The diepoxides of this invention, encompassed within Formula II, may be cured by a conventional polyepoxide hardener such as the wide variety of acids, Lewis acids, bases, and the like as well as amines, alcohols and other polyhydroxy compounds, thiols, esters, polyamides, and the like.

The polyurea which can be formed utilizing the monomers embodied within Formula II include the reaction product of the aforementioned norbornanes diisocyanates and any of the previously mentioned diamines. In addition, the carbamoyl halides of the aforementioned norbornane diamines may be interreacted with any of the aforementioned diamines to produce polyurea structures utilizing conventional polyurea polymerization conditions. For example, 2 - aminomethyl-5(or 6)-(2-aminoethyl)-norbornane can be reacted with the bis-carbamoylchloride of ethylene diamine or the same norbornane diamine to produce a very high melting crystalline polymer. A most desirable polyurea is one formed by the reaction of 2-isocyanatomethyl - 5(or 6)-(2-isocyanatoethyl) norbornane and piperazine or 2,5-dimethylpiperazine and the like. These polyureas are suitable as coating resins and for the formation of fibers and films.

The following examples serve to illustrate the practice of the above invention, but, however, such are not intended for the purpose of limiting this invention.

EXAMPLE 1

Norbornene (10.8 g., 0.115 mole) and t-butylperoxide (1.7 g., 0.0115 mole) were taken up in acetonitrile (472 g., 11.53 mole), and the solution was placed in a two-liter glass-lined autoclave equipped with rocker, automatic temperature control, and nitrogen purge line. The solution was thoroughly purged with nitrogen and heated to $140 \pm 5°$ C., with continuous rocking, for five hours. Work-up consisted of removing the unreacted acetonitrile and peroxide decomposition products (acetone and t-butanol) in vacuo, then distilling the residual liquid through an 18-inch Nester and Faust spinning band column. exo-2-cyanomethylnorbornane was collected in 97% yield (15.1 g., 0.112 mole, B.P. 130° at 1 mm., $n_D^{30}$ 1.4741–1.4744).

Analysis.—Calc'd for $C_9H_{13}$ (percent): C, 79.95; H, 9.70; N, 10.35. (M.W. 135). Found (percent): C, 80.06; H, 10.00; N, 10.19. (M.W. 134.)

EXAMPLE 2

A solution of 5-cyanonorbornene (31.5 g., 0.265 mole), acetonitrile (1086 g., 26.5 moles) and t-butyl peroxide (3.9 g., 0.0265 mole) was charged to a three-liter, stainless-steel rocking autoclave. The system was purged three times with 100 p.s.i. of nitrogen and then heated to $140 \pm 5°$ C., with continuous rocking, for five hours. V.p.c. analysis indicated that 50% of the starting 5-cyanonorbornene was still present. An additional charge of t-butyl peroxide (7.8 g., 0.053 mole) was added to the reaction mixture, and the reaction was continued, as before, for five hours. After removal of the unreacted acetonitrile and peroxide decomposition products (acetone and t-butanol), the residual liquid was fractionated through an 18-inch Nester and Faust spinning band column. Some unreacted 5-cyanonorbornene (9.4 g., 0.079 mole) was collected. Further distillation yielded 5(or 6)-cyanonorbornane-2-acetonitrile (17.8 g., 0.111 mole; B.P. 230–240° at 1 mm.; $n_D^{30}$ 1.4918–1.4924; 60% yield, based on unrecovered olefin).

V.p.c. analysis showed that the product consisted of at least three isomers. Infrared spectra (FIG. 5) were consistent with the specified isomeric structures (—CN absorption at 2240 cm.$^{-1}$, no norbornene double-band maxima at 1570 cm.$^{-1}$ and 707 cm.$^{-19}$.

Analysis.—Calc'd for $C_{10}H_{12}N_2$ (percent): C, 74.95; H, 7.54. (M.W. 160.) Found (percent): C, 74.90; H, 7.64. (M.W. 159.)

EXAMPLE 3

5(or 6)-cyanonorbornane-2-acetonitrile (33.7 g., 0.210 mole) was added to a solution of acetic acid (80 ml.), conc. sulfuric acid (160 ml.) and water (160 ml.), and the resulting reaction mixture was stirred under reflux for 2.5 hours. Then 200 ml. of water was added, and the solution was extracted with three 300 ml. portions of ether. The combined ether extracts were dried overnight over anhydrous sodium sulfate. Following filtration, the ether was rapidly evaporated, and the residual amber-colored liquid was taken up in methanol (500 ml.) and refluxed with an added 5 ml. conc. sulfuric acid for four hours. The volume of excess methanol was then reduced by distillation at extremely high reflux ratios until only about 200 ml. reaction mixture remained. Then the residual organic solution was washed with water (200 ml.) and extracted with three 100 ml. portions of ether. The combined ether extracts were dried and evaporated, and the residual liquid was fractionated in vacuo through a 5-inch Vigreux column. Following removal of a small forerun, methyl 5(or 6)-(methoxycarbonyl)-2-norbornaneacetate was collected in two fractions (26.3 g., 0.116 mole, B.P. 90–99° at 0.23 mm. and 99–106° at 0.55 mm., $n_D^{30}$ 1.4705–1.4716). The yield of isolated diester totaled 55%.

Analysis.—Calc'd for $C_{12}H_{18}O_4$ (percent): C, 63.70; H, 8.02. (M.W. 226.) Found (percent): C, 63.75; H, 8.03. (M.W. 227.)

EXAMPLE 4

A mixture consisting of 5(or 6)-cyanonorbornane-2-acetonitrile (38.2 g., 0.239 mole), isopropyl alcohol (500 ml.), and Raney nickel (5 g.) was charged to a one-liter, stainless steel, rocking autoclave. Ammonia (14.2 g., 0.837 mole) was added from a small pressure vessel. Hydrogen was then added to a total pressure of 2000 p.s.i., and the autoclave was heated to 150° C. and rocked at that temperature for 16 hours. Upon cooling to room temperature, the system was found to have a pressure of 1300 p.s.i. The reaction mixture was filtered, and the filtrate was subjected to fractionation on an 18-inch Nester and Faust spinning band column. After removal of the isopropyl alcohol and a small forerun, 5(or 6)-aminomethyl-2-(2-aminoethyl) norbornane was collected in two cuts (24.5 g., 0.146 mole, B.P. 98–101° at 1 mm., $n_D^{30}$ 1.5037–1.5039, 63% yield).

EXAMPLE 5

A solution of 5-methylol-2-norbornene (32.4 g., 0.261 mole) and t-butyl peroxide (3.8 g., 0.026 mole) in acetonitrile (1069 g., 26.1 moles) was charged to a 3-liter, stainless steel, rocking autoclave. The system was purged of air by adding nitrogen to a pressure of 100 p.s.i., then bleeding until only a small positive pressure remained; this was repeated twice. The autoclave was then heated to 140° C., while rocking, and held at that temperature for five hours. Analysis indicated that some of the olefin was unreacted. A second charge of t-butyl peroxide (3.8 g., 0.026 mole) was then added, and the heating procedure was repeated. The unreacted acetonitrile was rapidly distilled away, and the residual liquid was subjected to fractionation through a 5-inch Vigreux column. After collection of a forerun cut containing unreacted 5-methylol-2-norbornene (5.0 g., 48–60° at 0.04 mm.), two fractions of 5(or 6)-methylol-norbornane-2-acetonitrile were obtained (25.7 g., 0.156 mole, B.P. 108–119° at 0.05 mm., $n_D^{30}$ 1.4968; 70.6% yield, based on unrecovered olefin).

Analysis.—Calc'd for $C_{10}H_{15}ON$ (percent): C, 72.69; H, 9.15; N, 8.48. (M.W. 165.) Found (percent): C, 73.10; H, 9.48; N, 8.47. (M.W. 164.)

EXAMPLE 6

5-hydroxymethyl-2-norbornene (36 g., 0.29 mole), methanol (1059 g., 33 moles) and di-t-butyl peroxide (4.4 g., 0.03 mole) were placed in a 3-liter stainless steel rocker bomb, purged with nitrogen and heated to 410° C. After five hours at 140°, the bomb was cooled, and additional t-butyl peroxide (4.4 g., 0.03 mole) was added. Heating at 140° was continued for another five hours. The contents of the bomb were dumped (1062 g. total recovery), and methanol (1000 g., 98% recovery) was distilled away at atmospheric pressure. Continued distillation afforded the following fractions: (1) Unreacted 5-hydroxymethyl-2-norbornene (3.4 g., B.P. 43°/0.15 mm. to 90°/0.2 mm.); (2) heads fraction of product I (3.5 g., B.P. 114–120°/0.15 mm.); (3) analytical fraction of 2,5(or 6)-di(hydroxymethyl)norbornane (22.7 g., B.P. 120–124°/0.15 mm.); (4) tails cut of I (3.0 g., B.P. 136–186°/0.12 mm.).

Conversion: 88.4%
Efficiency: 73.1%
Yield: 64.6%

*Analysis.*—Calc'd for $C_9H_{16}O$ (percent): C, 69.19; H, 10.33. (M.W. 156.) Found (percent): C, 69.48; H, 10.26. (M.W. 160.)

EXAMPLE 7

Acetic acid (2268 g., 37.8 moles) was placed in a five-liter, round-bottom flask equipped with reflux condenser, dropping funnel, thermocouple well, nitrogen inlet and motor-driven paddle stirrer. The acid was flushed with nitrogen for 30 minutes and heated to reflux with continued stirring and nitrogen purge. A solution of norbornadiene (52.3 g., 0.568 mole) and t-butyl peroxide (11.0 g., 0.075 mole) in acetic acid (1134 g., 18.9 moles) was placed in the dropping funnel and was added dropwise to the refluxing acetic acid (120°) over a period of 12 hours. The reaction mixture was refluxed for an additional 12 hours. After the excess acetic acid was removed in vacuo, the residual liquid was carefully distilled on a vacuum-jacketed Vigreux column. A small forerun (2.0 g., B.P. 108–112° at 1 mm.) was rejected. Then six cuts of the product, 3-nortricyclene-acetic acid, were collected (43.6 g., 0.287 mole, B.P. 113–114° at 1 mm., $n_D^{20}$ 1.4919–1.4920). An amber residue, which hardened into a solid, clear resin, remained (45.8 g.; average M.W. 271). The yield of 1:1 adduct was 50.5%, based on starting norbornadiene.

*Analysis.*—Calc'd for $C_9H_{12}O_2$ (percent): C, 71.00; H, 7.96. (M.W. 152.) Found (percent): C,70.70; H, 7.98. (M.W. 150.)

EXAMPLE 8

Glacial acetic acid (2268 g., 37.8 moles) was added to a reaction flask, purged with nitrogen for 30 minutes and heated to reflux. To this stirred, refluxing acid was added a solution or norbornene (53.4 g., 0.568 mole) and t-butyl peroxide (11.0 g., 0.075 mole) in acetic acid (1134 g., 18.9 moles) over a period of 12 hours. After addition was complete, the reaction mixture was refluxed for an additional six hours. The excess acetic acid was rapidly distilled off, in vacuo, and the residual liquid was carefully fractionated on an 8-inch, vacuum-jacketed Vigreux column. After a small forerun was taken off (1.2 g., B.P. 93° at 1 mm.), the principal fractions containing *exo*-2-norbornaneacetic acid were collected (70.7 g., 0.459 mole, B.P. 96–99° at 1 mm., $n_D^{30}$ 1.4802–1.4830). A small amount (9.0 g.) of dark, viscous residue remained. The yield of *exo*-2-norborneneacetic acid was 81%, based on starting norbornene.

*Analysis.*—Calc'd for $C_9H_{14}O_2$ (percent): C, 70.10; H, 9.15. (Neutralization equivalent 154.2.) Found (percent): C, 69.91; H, 9.04. (Neutralization equivalent 154.3.)

EXAMPLE 9

A solution of 5 (or 6)-methylolnorbornane - 2 - acetonitrile (16.0 g., 0.097 mole), water (150 ml.), conc. sulfuric acid (15 ml.) and methanol (35 ml.) was stirred under reflux for 72 hours. Water (50 ml.) was then added, and the suspension was extracted with four 200 ml. portions of ether. The combined ether extracts were dried over anhydrous $Na_2SO_4$, filtered, and evaporated. The residual liquid was taken up in methanol (200 ml.) and refluxed in the presence of conc. sulfuric acid (5 ml.) for 24 hours. Methanol was distilled from the reaction mixture until a total of about 50 ml. remained in the distillation flask. This was taken up in ether (200 ml.) and washed with water (100 ml.). The water layer was then twice extracted with ether (200 ml. ea.), and the combined ether extracts were dried over anhydrous $Na_2SO_4$, filtered, and evaporated. The residual liquid was distilled through a 10 in. Vigreux column under reduced pressure. Methyl 5(or 6)-methylolnorbornane-2-acetate was collected in four fractions (12.9 g., 0.0652 mole, B.P. 119–130° at 0.5 mm., $n_D^{20}$ 1.4872–1.4892). The yield of recovered product, based on starting hydroxynitrile, was 67.3%.

*Analysis.*—Calc'd for $C_{11}H_{18}O_3$ (percent): C, 66.67; H, 9.09. (M.W. 198.) Found (percent): C, 66.91; H, 9.20. (M.W. 202.)

EXAMPLE 10

2-(2-isocyanatoethyl) - 5(6) - isocyanatomethylnorbornane was produced in the following manner:

In a 5-liter rb flask equipped with mechanical stirrer, dropping funnel, and condenser, was placed 1170 grams of toluene which was cooled to 0° C. and phosgene (806 grams) was then added. Keeping the temperature close to 0° C., 131 grams of 2-(2-aminoethyl)-5-(6)-aminoethylnorbornane was added dropwise to the phosgene solution with vigorous stirring over a period of 2 hours. Stirring was continued overnight while the solution warmed to room temperature. The dropping funnel was replaced by a fritted sparge, and phosgene was sparged through the solution while the temperature was maintained at 100° C. until the evolution of hydrogen chloride had ceased (2 hours) as determined by gas chromotographic analysis. Nitrogen was sparged through the solution for ½ hour to remove excess phosgene, the solution filtered and stripped of toluene at reduced pressure, and the residue (18 grams) then distilled through a 20 centimeter helix-packed column. Five fractions were taken after a small forecut.

| Fraction | Boiling point | Pressure (mm.) | Weight (grams) | Percent purity | $n_D^{30}$ |
|---|---|---|---|---|---|
| 1 | 147 | 0.70 | 22 | 98.3 | 1.4923 |
| 2 | 147.5 | 0.95 | 40 | 98.8 | 1.4930 |
| 3 | 148 | 1.10 | 41 | 99.0 | 1.4930 |
| 4 | 149 | 1.20 | 40 | 99.5 | 1.4928 |
| 5 | 151 | 1.10 | 10 | 99.2 | 1.4929 |

Hydrolyzable chloride was practically nil for all fractions.

*Analysis* (of fraction 4).—Calc'd for $C_{12}H_{16}N_2O_2$ (percent): C, 65.50, H, 7.30, N, 12.70. Found (percent): C, 65.58, H, 7.50, N, 12.76.

EXAMPLE 11

A solution of 5(or 6)-cyanonorbornene-2-acetonitrile (300 g., 1.87 moles) and acetic acid (770 ml.) was charged to a 5-liter flask equipped with a condenser, stirrer, and dropping funnel. To this was added rapidly a solution of sulfuric acid (1400 ml.) and water (1400 ml.). The resulting material was stirred at reflux (ca. 132° C.) for six hours. The reaction mixture was then divided into three equal portions, each of which was partitioned between water (500 ml.) and ether (500 ml.). The aqueous layer so obtained was extracted three times with 400 ml. portions of ether. The combined organic extracts were dried over anhydrous sodium sulfate, filtered and stripped of the ether to leave a dark residual liquid. This material was added dropwise to stirred thionyl chloride (1251 g., 9.0 moles) at room temperature. When addition was complete, the reaction mixture was refluxed for three hours, then distilled. After distillation of the unreacted thionyl chloride, the reaction product, 5(or 6)-chloroformyl-2-(chloroformylmethyl)norbornane, was collected in two fractions (B.P. 138–146° C. at 0.35–0.40 mm., $n^{25}_D$ 1.5104). Total yield was 284 g. (1.21 moles), or 64.5%.

The infrared spectrum of 5(or 6)-chloroformyl-2-(chloroformylmethyl)norbornane showed diagnostic maxima at 1792 cm.$^{-1}$ (acid chloride carbonyl) and 725 cm.$^{-1}$ (carbon-chlorine stretching). No cyano band (ca. 2240 cm.$^{-1}$) or carboxylic acid frequencies (very broad band centered near 2900 cm.$^{-1}$) were present.

*Analysis.*—Calc'd for $C_{10}H_{12}O_2Cl_2$ (percent): C, 51.06; H, 5.11; Cl, 30.21. Found (percent): C, 51.12; H, 5.17; Cl, 30.33.

EXAMPLE 12

A mixture was formed of 82.1 parts by weight of 2,2-bis-[4-(2,3-epoxypropoxy)phenyl]propane and 17.9 parts by weight of an isomeric mixture of 2-aminomethyl-5(6)-(2-aminoethyl)norbornane. The mixture which was prepared in a dry container and degassed at 5 milliliters of mercury for about 10 minutes in a vacuum desicator, was then poured into a 1/8 inch plaque mold which has been coated with a mold release agent. The mixture was allowed to gel at room temperature (25° C.) and gellation took place in 75 minutes. The mixture was then left in the plaque mold for a total of 10 hours at room temperature and thereafter was heated in an oven at 120° C. for 4 hours. The resulting cured resin had the following properties:

| | |
|---|---|
| Heat distortion temperature, ° C. | 116 |
| Tensile strength, p.s.i. | 10.800 |
| Elongation, percent | 65 |
| H₂O absorption percent weight gain after 7 days at 25° C. | 0.38 |

EXAMPLE 13

A resin was prepared by reacting at 95° C., in a dry, sealed bottle, 28.5 parts by weight of an isomeric mixture of 2-(2-isocyanatoethyl)-5(6)-isocyanatomethyl norbornane, 9.2 parts by weight of poly(propylene oxide)-glycerine adduct having an average molecular weight of 633, 12.3 parts by weight of hydroxy terminated polypropylene glycol having an average molecular weight of 425, all dissolved in a mixture of 25 parts by weight of Cellosolve acetate and 25 parts by weight of toluene. Reaction was continued until residual isocyanate content approximates that calculated for complete hydroxyl reaction. The resin was then coated on steel panels, which after curing at room temperature for 32 days at 350° F., provided a 3–4 mils film. The film had the following properties:

TABLE

Physicals:

| | |
|---|---|
| Sward hardness, 1 da. | 0 |
| Sward hardness, final | 66 |
| Pencil hardness | B |
| Bend [1] | Pass. |
| Front impact, in. lbs. | 20–28 |
| Back Impact, in. lbs. | 0.4 |
| Adhesion [2] | Excellent |
| 60° gloss, percent | 104 |
| Visual gloss [3] | 9+ |
| Blue light reflect, percent | 76 |

Chemicals:

| | |
|---|---|
| Water resistance [4] | 9+ |
| 1% H₂SO₄ resistance [4] | 8+ |
| 3% NaOH resistance [4] | 9+ |
| 20% NaOH resistance [4] | 10− |
| 50% EtOH resistance [4] | 7 |
| L.O.F.A. resistance [4] | 6 |
| Syn. Gaso. resistance [5] | 10− |
| Oleo resistance [6] | 9+ |

[1] Conical mandrel.
[2] Scotch tape jerked off cross cut coating.
[3] Degree of mirror-image on 0–10 scale.
[4] For 24 hr. test on 0–10 scale.
[5] For 15 min. test on 0–10 scale.
[6] For 7 day test on 0–10 scale.

EXAMPLE 14

A mixture of 4.6 grams (0.01 mole) of adipic acid and 130 milliliters of absolute ethyl alcohol was warmed to 50° C. whereupon solution was achieved. A solution of 16.9 grams (0.1005 mole) of an isomeric mixture of 5 (or 6)-aminomethyl-2-aminoethyl norbornane in 20 ml. of absolute ethyl alcohol was added slowly to the adipic acid solution. A mild heat of reaction was noted on addition, the temperature increasing from 42° C. to 57° C. The resulting water-white solution was then cooled to room temperature and allowed to crystallize for 2 days. The salt of adipic acid and the diamino norbornane was then filtered, washed with cold absolute alcohol and vacuum dried to constant weight. The yield was found to be essentially quantitative. The white crystalline salt melts over a range from 212° C. to 220° C. and has a pH of 6.6, determined on a 1 percent solution of the salt in water, using a pH meter.

*Analysis.*—Calc'd for $C_{16}H_{30}N_2O_4$ (percent): C, 61.00; H, 9.61; N, 8.98. Found (percent): C, 60.41; H, 10.25; N, 8.97.

Twenty grams of the prepolymer salt were charged into a heavy walled polymer tube and the tube neck connected to a three way stopcock. The tube was purged of air by alternately evacuating to about 1 mil mercury and filling with nitrogen. After several such cycles, the tube was sealed shut by means of a torch while the tube was under vacuum. After one hour at 216° C. the bath temperature was increased to 230° C. for an additional hour. The tube was then removed from the bath and cooled. After cooling, the tube was opened and two 10/30 joints were sealed to its neck. One opening was fitted with a capillary tube and the other fitting connected to a pump. The tube was then lowered into the wax bath at 270° C. and the pressure gradually reduced to 0.5 mil mercury. After two hours, the slower rate of nitrogen bubbles from the capillary indicated increased melt viscosity. The tube was then removed and allowed to cool overnight. The light yellow polymer was recovered by breaking the tube and separating the adhering glass. The recovery of the polymer was 16.0 grams (90.4 percent). The reduced viscosity of the polymer was 0.23, determined at 30° C. with 0.2 gram of a polymer dissolved in 100 ml. of N,N-dimethylformamide.

EXAMPLE 15

To a 500 ml., 4-necked flask equipped with a stirrer, condenser, nitrogen inlet and thermometer was charged, at 5° C., 16.8 grams of an isomeric mixture of 5 (6)-aminomethyl-2-aminoethyl norbornane dissolved in 225 ml. of dry benzene. To this solution was added dropwise a solution containing 17.6 grams of a mixture of 2,4-tolylene diisocyanate and 2,6-tolylene diisocyanate dissolved in 75 ml. of benzene. The rate of addition was such as to cause no appreciable temperature rise. Upon addition of the tolylene diisocyanate a uniform white particle precipitated. After addition was complete, the mixture was allowed to stand at room temperature overnight. The polymer was isolated by addition of the mixture to dry methanol causing precipitation of the polymer and the precipitate was recovered by filtration. The polymer yield was 32.6 grams (94 percent). The reduced viscosity of the polyurea was 0.15, determined at 30° C. with 0.2 gram of polyurea dissolved in 100 ml. of N,N-dimethylformamide.

Analysis.—Calc'd for $C_{19}H_{26}N_4O_2$ (percent): C, 66.60; H, 7.64; N, 16.40. Found (percent): C, 65.89; H, 7.35; N, 15.61.

EXAMPLE 16

The procedure employed in experiments A through P, set forth in the following table, involved intermixing an isomeric mixture of 2-(2-isocyanatoethyl)5(6)-isocyanatomethyl norbornane and a diol which was previously dehydrated by heating at 100° C. under 2 mil mercury pressure for one hour. The mixture was agitated and heated to the temperatures shown in the following table and maintained at such temperature for the times shown. The resulting isocyanate-terminated prepolymers were allowed to stand for the times shown in the preceding table prior to determination of the equivalent weight by the standard aniline analysis and subsequent casting. Prior to casting, the prepolymer was dissolved in N,N-dimethylformamide providing solutions having the percent solids indicated in the table and the calculated amount of diamine extender, either ethylene diamine or 4,4'-methylenedianiline, in dimethylformamide was introduced rapidly. Stirring was continued for about 10 minutes and 50 grams of the solution was poured into Teflon molds whereupon the molds were placed in an air circulating oven for 16 hours, removed and cooled, and allowed to stand at least one week prior to testing.

The above elastomers can be spun while in N,N-dimethylformamide solution into a water coagulating bath to produce fibers and filaments having excellent elastomeric properties.

Though this invention has been described with respect to specific details thereof, it is not intended that this invention shall be limited by such details.

What is claimed is:

1. A compound selected from the group consisting of 2,5- and 2,6-disubstituted norbornanes of the formula:

wherein X is

and Y is X or

wherein $R^I$ and $R^{II}$ are hydrogen and $R^{VII}$ is a member of the group of chlorine, hydroxyl, alkoxy of from 1 to 18 carbon atoms, phenyloxy, and benzyloxy.

2. 5(6) - chloroformyl - 2 - (chloroformylmethyl)norbornane.

References Cited
UNITED STATES PATENTS 2,972,602   2/1961   Caldwell ------------ 260—78

LORRAINE A. WEINBERGER, Primary Examiner

E. J. GLEIMAN, Assistant Examiner

U.S. Cl. X.R.

260—468 B, 514 B